(12) United States Patent
Sakamoto et al.

(10) Patent No.: US 9,752,648 B2
(45) Date of Patent: Sep. 5, 2017

(54) TOOTHED BELT

(75) Inventors: Keiji Sakamoto, Yamatokoriyama (JP);
Shinji Uchigashima, Yamatokoriyama (JP); Masanao Sakamoto, Yamatokoriyama (JP)

(73) Assignee: Gates Corporation, Denver, CO (US)

( * ) Notice: Subject to any disclaimer, the term of this patent is extended or adjusted under 35 U.S.C. 154(b) by 843 days.

(21) Appl. No.: 14/001,458

(22) PCT Filed: Feb. 16, 2012

(86) PCT No.: PCT/JP2012/053606
§ 371 (c)(1),
(2), (4) Date: Oct. 31, 2013

(87) PCT Pub. No.: WO2012/114967
PCT Pub. Date: Aug. 30, 2012

(65) Prior Publication Data
US 2014/0080647 A1    Mar. 20, 2014

(30) Foreign Application Priority Data

Feb. 24, 2011 (JP) .................................. 2011-038394
Dec. 2, 2011 (JP) .................................. 2011-264739

(51) Int. Cl.
*F16G 1/04* (2006.01)
*F16G 1/10* (2006.01)
(Continued)

(52) U.S. Cl.
CPC .............. *F16G 1/04* (2013.01); *B29D 29/08* (2013.01); *C08L 63/00* (2013.01); *F16G 1/10* (2013.01); *F16G 1/28* (2013.01)

(58) Field of Classification Search
CPC ..... F16G 1/10; F16G 1/28; F16G 1/04; B29D 29/08; C08L 63/00
(Continued)

(56) References Cited

U.S. PATENT DOCUMENTS 5,120,280 A * 6/1992 Mizuno .................... F16G 1/28
474/260
5,310,386 A    5/1994 Mizuno et al.
(Continued)

FOREIGN PATENT DOCUMENTS

CN    1302359 A    7/2001
JP    03216329 A   9/1991
(Continued)

OTHER PUBLICATIONS

Ashcroft, W.R., "Curing agents for epoxy resins" article from "Chemistry and Technology of Epoxy Resins", 1993, Springer-Science+Business Media, B.V., pp. 37-71.*
(Continued)

*Primary Examiner* — Brian Handville
(74) *Attorney, Agent, or Firm* — Paul N. Dunlap, Esq.; Jeffrey A. Thurnau, Esq.

(57) ABSTRACT

Provided is a toothed belt that has satisfactory durability even under high-temperature and high-load conditions or within an oil or water environment. The toothed belt 10 comprises a belt body 13 including a tooth rubber portion 11 and a backing rubber portion 12. A surface of the tooth rubber portion 11 is covered with a facing fabric 20. The facing fabric 20 is subjected to RFL treatment, and has an outer surface 21 covered with a hardened material of a first epoxy resin. The softening point of the hardened material of the first epoxy resin is, for example, 110° C. or higher. The epoxy equivalent of the first epoxy resin is, for example, 100 to 1500 g/eq. Alternatively, the facing fabric 20 is subjected to impregnation treatment with a treatment agent including a second epoxy resin, a hardener for hardening the second epoxy resin, and a rubber component.

19 Claims, 15 Drawing Sheets

(51) Int. Cl.
*F16G 1/28* (2006.01)
*C08L 63/00* (2006.01)
*B29D 29/08* (2006.01)

(58) Field of Classification Search
USPC .................................. 474/201–205; 156/140
See application file for complete search history.

(56) References Cited

U.S. PATENT DOCUMENTS

| | | | |
|---|---|---|---|
| 5,807,194 A * | 9/1998 | Knutson | B29D 29/08 474/237 |
| 6,419,775 B1 | 7/2002 | Gibson et al. | |
| 6,641,905 B1 | 11/2003 | Fujimoto et al. | |
| 6,656,073 B1 | 12/2003 | Di Meco et al. | |
| 7,041,021 B2 | 5/2006 | Gibson et al. | |
| 2006/0174997 A1 * | 8/2006 | Gibson | F16G 1/28 156/139 |

FOREIGN PATENT DOCUMENTS

| | | |
|---|---|---|
| JP | 06101741 A | 4/1994 |
| JP | 2003096292 A | 4/2003 |
| JP | 2004-324832 A | 11/2004 |
| JP | 2009-299883 A | 12/2009 |

OTHER PUBLICATIONS

Ratna, Debdatta, "Handbook of Thermoset Resins", 2009, Lightning Source Inc., pp. 155-157.*
Machine Translation for JP 2009-299883. 2009.*
Parchem.com Methyl Ethyl Ketone Reagent Grade ACS, 2017, obtained from http://www.parchem.com/chemical-supplier-distributor/Methyl-Ethyl-Ketone-Reagent-Grade-ACS-007791.aspx.*
Japanese Patent Office, International Search Report PCT/JP2012/053606, dated Apr. 24, 2012.
Japanese Patent Office, International Search Report, dated Apr. 24, 2012.

* cited by examiner

TOOTHED BELT

TECHNICAL FIELD

The present invention relates to a toothed belt, and particularly to a toothed belt used under high-temperature and high-load conditions or within an oil or water environment.

BACKGROUND ART

Conventionally, toothed belts have been used for power transmission in internal combustion engines and the like. To improve the wear resistance of a toothed belt, a facing fabric is adhered to a tooth surface of the belt. The facing fabric is subjected to impregnation treatment with a treatment agent such as RFL or rubber cement.

Recently, toothed belts have been increasingly used under high-temperature and high-load conditions. That is, the use of more compact engine compartments or the like requires toothed belts to be miniaturized and functional in higher temperature environments. Moreover, toothed belts have been finding wider applications, and may be used in the presence of oil in some cases.

When a toothed belt is used in a high-temperature and high-load environment, however, a facing fabric treatment agent such as RFL can wear away rapidly. For this reason, cracks and the like are more likely to occur in the facing fabric, and the lifetime of the toothed belt may be shortened. Moreover, since the above-described facing fabric treatment agent does not have sufficient oil resistance, the toothed belt tends to have a reduced lifetime when used in the presence of an oil environment.

Patent Document 1 discloses that a facing fabric is subjected to RFL treatment, and then further subjected to impregnation treatment with rubber cement to which an epoxy compound or the like is added.

In addition, technologies for improving the durability of a belt by preventing the degradation of a facing fabric by treating it with RFL or rubber cement have been widely known for some time. However, when the belt is operated in the presence of oil or water, or under high-temperature conditions, treatment agents such as RFL and rubber cement are prone to degradation and cannot protect the facing fabric sufficiently. For this reason, the treatment agent applied to the facing fabric wears away rapidly, and pulleys come in direct contact with the fiber material of the facing fabric. As a result, cracks and the like occur in the facing fabric, and the durability of the belt is compromised.

For example, a scheme is also known in which the tensile strength of a facing fabric is improved by adding an aromatic epoxy resin to an RFL treatment liquid, as disclosed in Patent Document 2.

Patent Document 1: Japanese Patent Application Publication No. 2004-324832.
Patent Document 2: Japanese Patent Application Publication No. 2001-220008.

SUMMARY OF INVENTION

Technical Problems

However, the epoxy compound in Patent Document 1 is used to improve the adhesion between the facing fabric and the belt body, but not to form a coating on a surface of the facing fabric. For this reason, the epoxy compound in the Patent Document 1 does not improve the wear resistance or the resistance to oil.

In addition, a fluororubber is used as the rubber of the belt body to improve the oil resistance in some cases. However, a fluororubber may swell depending on what type of oil is present. For this reason, the oil resistance obtained by simply employing a fluororubber for the belt body is insufficient in some cases.

Moreover, a treatment liquid based on RFL cannot sufficiently improve the water-resistance, heat-resistance, oil resistance, and the like of the facing fabric, even when an epoxy resin is further added to the treatment liquid, and cannot sufficiently improve the durability of a belt used under high-temperature and high-load conditions or in an oil or water environment.

The present invention has been made in view of the above-described problems, and an object of the present invention is to improve the wear resistance and oil- and water-resistance of a facing fabric, and to provide a toothed belt that has satisfactory durability even when used under high-temperature and high-load conditions or within an oil or water environment.

Solution to Technical Problems

A toothed belt according to the first aspect of the present invention comprises a belt body that includes a tooth portion and a tooth bottom portion alternately provided on one surface side thereof along the longitudinal direction, and a facing fabric which is provided on one surface of the belt body and has an outer surface covered with a hardened material of a first epoxy resin.

The softening point of the hardened material of the first epoxy resin is preferably 110° C. or higher. The epoxy equivalent of the first epoxy resin is preferably 150 to 1500 g/eq. In addition, the hardened material of the first epoxy resin is preferably applied to the facing fabric which is subjected to RFL treatment.

The first epoxy resin is hardened by a first hardener, and the first hardener includes, for example, at least one hardener selected from the group consisting of amine-based hardener, acid anhydride-based hardener, phenol novolak-based hardener, imidazole-based hardener, and dicyandiamide-based hardener. The first hardener is preferably an imidazole-based hardener.

The first epoxy resin preferably includes at least one epoxy resin selected from the group consisting of bisphenol A epoxy resin, bisphenol F epoxy resin, novolak-type epoxy resin, biphenyl-type epoxy resin, phenoxy-type epoxy resin, and long-chain aliphatic epoxy resin.

A method of manufacturing a toothed belt according to the first aspect of the present invention comprises coating one surface of a facing fabric with a first epoxy resin solution including a first epoxy resin, integrating rubber disposed on the other surface side of the coated facing fabric with the facing fabric and hardening the first epoxy resin coating the facing fabric by vulcanization.

A toothed belt according to the second aspect of the present invention comprises a belt body that includes a tooth portion and a tooth bottom portion alternately provided on one surface side thereof along the longitudinal direction and a facing fabric which is applied to cover the one surface of the belt body, the facing fabric being treated with a treatment agent composition including a second epoxy resin, a second hardener for hardening the second epoxy resin, and a rubber component.

The second epoxy resin includes, for example, at least one epoxy resin selected from the group consisting of aliphatic epoxy resin, novolak-type epoxy resin, bisphenol A epoxy resin, bisphenol F epoxy resin, biphenyl-type epoxy resin, and phenoxy-type epoxy resin. In these epoxy resins, the epoxy resin preferably includes at least one epoxy resin selected from the group consisting of aliphatic epoxy resin and novolak-type epoxy resin. In addition, the second hardener is preferably an imidazole-based hardener.

The rubber component is preferably latex, and the facing fabric is preferably subjected to impregnation treatment with a mixture obtained by diluting the treatment agent composition with water. In addition, the rubber component is preferably nitrile rubber (NBR), hydrogenated nitrile rubber (HNBR), or hydrogenated carboxylic nitrile rubber (HXNBR). Moreover, the weight ratio of the second epoxy resin to the rubber component (for example, latex) is, for example, from 1:9 to 9:1.

The portion of the belt body to be adhered to the facing fabric is preferably molded by vulcanizing a rubber composition including rubber, resorcinol, and a melamine compound. In addition, the rubber of the portion of the belt body to be adhered to the facing fabric more preferably includes HNBR or HXNBR.

The outer surface of the facing fabric treated with the treatment agent composition including the second epoxy resin, the second hardener for hardening the second epoxy resin, and the rubber component may be further coated with a hardened material of a third epoxy resin.

A method of manufacturing a toothed belt according to the second aspect of the present invention is a method of manufacturing a toothed belt comprising a belt body including a tooth portion and a tooth bottom portion alternately provided on one surface side thereof along the longitudinal direction, and a facing fabric applied to cover the one surface of the belt body; the method comprising treating the facing fabric with a treatment agent composition including a second epoxy resin, a second hardener for hardening the second epoxy resin and a rubber component, and layering an unvulcanized rubber sheet over the treated facing fabric followed by vulcanization molding to thereby obtain the toothed belt.

Advantageous Effects of Invention

According to the first aspect of the present invention, the wear resistance and oil resistance of the facing fabric are improved because the surface of the facing fabric is covered with the first epoxy resin. Hence, the toothed belt has satisfactory durability even when used under high-temperature and high-load conditions or in the presence of an oil environment.

Meanwhile, according to the second aspect of the present invention, the water resistance, heat resistance, oil resistance, and the like of the belt are improved because of the modification to the treatment of the facing fabric of the toothed belt. Hence, the toothed belt has satisfactory durability, even when the belt is used under high-temperature and high-load conditions or in an oil or water environment.

LIST OF REFERENCE NUMBERS 10 toothed belt
13 belt body
20 facing fabric
21 outer surface

DESCRIPTION OF EMBODIMENTS

Hereinafter, an embodiment of the first aspect of the present invention is described with reference to the drawings.

<Embodiment>

Figure 1:
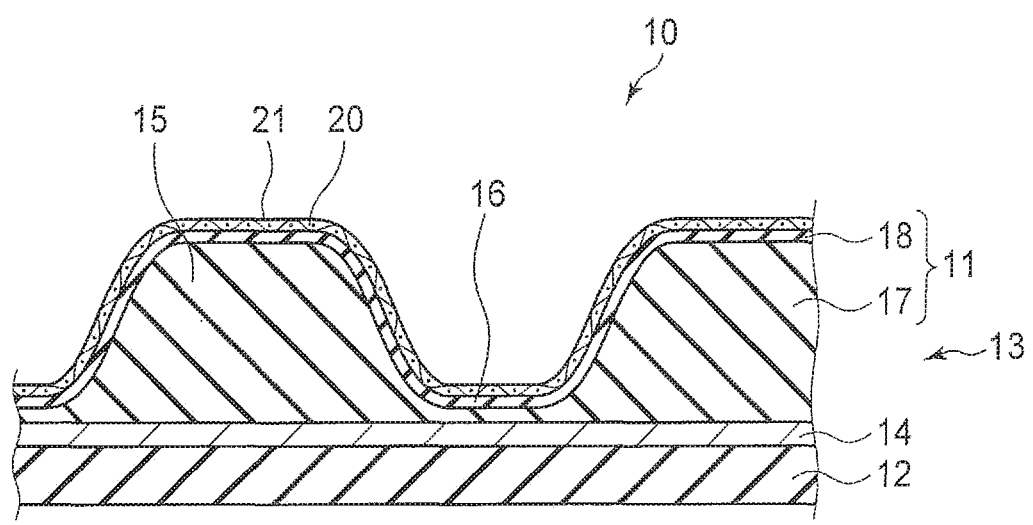
FIG. 1 is a cross-sectional view of a toothed belt according to an embodiment of the first aspect of the present invention.

FIG. 1 shows a toothed belt of the embodiment of the first aspect of the present invention. The toothed belt 10 is formed in an endless shape, and is used, for example, by being wound around driven and driving pulleys (not illustrated) in an internal combustion engine or the like. The toothed belt 10 is a timing belt which transmits a torque (driving force) from a driving pulley to a driven pulley by synchronous power transmission.

The toothed belt 10 includes a belt body 13 and a cord 14. The belt body 13 is formed of a tooth rubber portion 11 provided on one surface side and a backing rubber portion 12 provided on the other surface side; the tooth rubber portion 11 and the backing rubber portion 12 are integrated together. The cord 14 is spirally wound and embedded in a boundary portion between the tooth rubber portion 11 and the backing rubber portion 12, while extending in the longitudinal direction of the belt.

In the tooth rubber portion 11, a tooth portion 15 and a tooth bottom portion 16 are alternately formed on the one surface side of the belt body 13 along the longitudinal direction of the belt. The tooth rubber portion 11 includes a core rubber portion 17 and a tooth surface rubber portion 18. The core rubber portion 17, which occupies for a large proportion of the tooth portion 15, is laminated on the backing rubber portion 12, and is formed along the shape of the tooth portion 15. The tooth surface rubber portion 18 is thin and is laminated on the core rubber portion 17. A facing fabric 20 covering the tooth rubber portion 11 is adhered onto a surface of the tooth surface rubber portion 18 (i.e., one surface of the belt body 13).

A short fiber (not illustrated) made of a nylon fiber, an aramid fiber, or the like is loaded in the core rubber portion 17, whereas short fiber is not loaded in either the tooth surface rubber portion 18 or the backing rubber portion 12. For this reason, the modulus of the core rubber portion 17 is higher than those of the tooth surface rubber portion 18 and the backing rubber portion 12.

A hydrogenated nitrile rubber (HNBR), a nitrile rubber (NBR), a chloroprene rubber (CR), an ethylene-propylene-diene rubber (EPDM), a fluororubber, a mixture thereof, or the like is used as a rubber component of each of the backing rubber portion 12, the core rubber portion 17, and the tooth surface rubber portion 18, which constitute the belt body 13. From the viewpoints of heat resistance, durability, and the like, HNBR is preferable. The same rubber component or different rubber components may be used for the rubber portions 12, 17, and 18.

In this embodiment, the facing fabric 20 is subjected to RFL (resorcin-formalin-latex) treatment, and has an exterior facing outer surface 21 (i.e., the surface on the side not adhered to the belt body 13) covered with a hardened material of a first epoxy resin.

Although not particularly limited, the facing fabric 20 is a woven fabric including first threads (for example, weft threads) extending along the longitudinal direction of the belt and second threads (for example, warp threads) extending along the width direction of the belt; the first threads and second threads are woven. In the facing fabric 20, for example, the first threads are constituted of elastic threads, and the second threads are constituted of non-elastic threads. Thus, the facing fabric 20 is elastic in the longitudinal direction of the belt.

The RFL treatment of the facing fabric 20 is conducted by impregnation treatment in which the facing fabric 20 is immersed in an RFL treatment liquid, and then dried by heat. The RFL treatment liquid includes latex and a resorcin-formaldehyde condensate, which are diluted with, for example, water or the like. As for the latex, latex of any of the above-described rubber components and the like is used, and HNBR latex is preferably used. In addition, the adhesion amount (solid component) of RFL applied to the facing fabric 20 is about 40 to 80 g/m$^2$.

In this embodiment, the coating of the hardened material of the first epoxy resin is formed as follows. Specifically, a first epoxy resin solution obtained by diluting the first epoxy resin and a first hardener with a solvent or the like is coated onto one surface of the facing fabric 20 subjected to RFL treatment. Then, the first epoxy resin is hardened by the heat during the vulcanization of the rubber, which is described later. The solvent included in the first epoxy resin solution coated onto the facing fabric 20 is preferably evaporated before vulcanization by natural drying or the like.

Examples of the first epoxy resin include bisphenol A epoxy resin, bisphenol F epoxy resin, novolak-type epoxy resin, biphenyl-type epoxy resin, phenoxy-type epoxy resin, long-chain aliphatic epoxy resin, and the like. One of these first epoxy resins alone or a combination of two or more thereof may be used. In these epoxy resins, bisphenol A epoxy resin or novolak-type epoxy resin is preferable as the first epoxy resin.

The first epoxy resin is preferably of a so-called solid type with a melting point higher than normal temperature (25° C.). The use of a solid type results in good handle ability of the first epoxy resin solution, because the yet-unhardened first epoxy resin solution coating the facing fabric 20 is less likely to be tacky, once the solvent has evaporated. However, the melting point of the first epoxy resin is preferably lower than the heating temperature during the vulcanization to be described later, because the first epoxy resin is difficult to harden if it is not melted.

In addition, to obtain satisfactory heat resistance of the hardened material of the first epoxy resin, the epoxy equivalent of the first epoxy resin according to JIS K 7236 is preferably relatively low, and, for example, preferably 100 to 1500 g/eq, and more preferably 150 to 1000 g/eq.

The first epoxy resin is hardened by the first hardener. Examples of the first hardener include amine-based hardener, acid anhydride-based hardener, phenol novolak-based hardener, imidazole-based hardener, dicyandiamide-based hardener, and the like. One of these first hardeners alone or a combination of two or more thereof may be used.

In these hardeners, imidazole-based hardener, which is a catalytic hardener, is preferable as the first hardener. The imidazole-based hardener, which is a catalytic hardener, polymerizes the first epoxy resin by the catalytic direct reaction of epoxy rings. Hence, the hardness of the hardened material can be easily increased, and thus the frictional coefficient of the outer surface 21 of the facing fabric 20 can be easily reduced. In addition, the added amount of the imidazole-based hardener can be small. This small amount results in good handleability of the first epoxy resin solution, because the yet-unhardened first epoxy resin solution coating the facing fabric 20 is less likely to be tacky, once the solvent has evaporated.

Although not particularly limited, the hardened material of the first epoxy resin preferably has a relatively high softening point, in order to achieve satisfactory wear resistance of the facing fabric 20 by maintaining a high hardness even at a high temperature, and thus providing a satisfactory frictional coefficient to the tooth surface. Specifically, the softening point is preferably 110° C. or higher. Note that the softening point is measured by using a thermomechanical analyzer "TMA/SS120U" (manufactured by SII NanoTechnology Inc.), under the following conditions: measuring temperature range: 30° C. to 350° C.; load: 100 mN; and temperature rise: 5° C./minute.

If the hardened material of the first epoxy resin is too thick, cracks or the like may occur, from which tooth cracks may be started. For this reason, the adhesion amount (solid component) of the first epoxy resin solution (i.e., the hardened material of the first epoxy resin) to the facing fabric 20 is preferably relatively small, and is, for example, about 10 to 50 g/m$^2$. The adhesion amount is preferably smaller than ½ of the adhesion amount (solid component) of RFL. In addition, the facing fabric 20 is usually a woven fabric, and has an uneven surface due to the weave texture. The adhesion amount is preferably such an amount that the unevenness is left on the surface (the outer surface 21), even after the surface is covered with the hardened material. If the outer surface 21 covered with the hardened material of the first epoxy resin has unevenness that originated from the unevenness of the weave texture, it will be highly likely that the generation of noise will be prevented, especially when the belt is used in a state where the belt (the facing fabric 20) is not in contact with oil.

Figure 2:
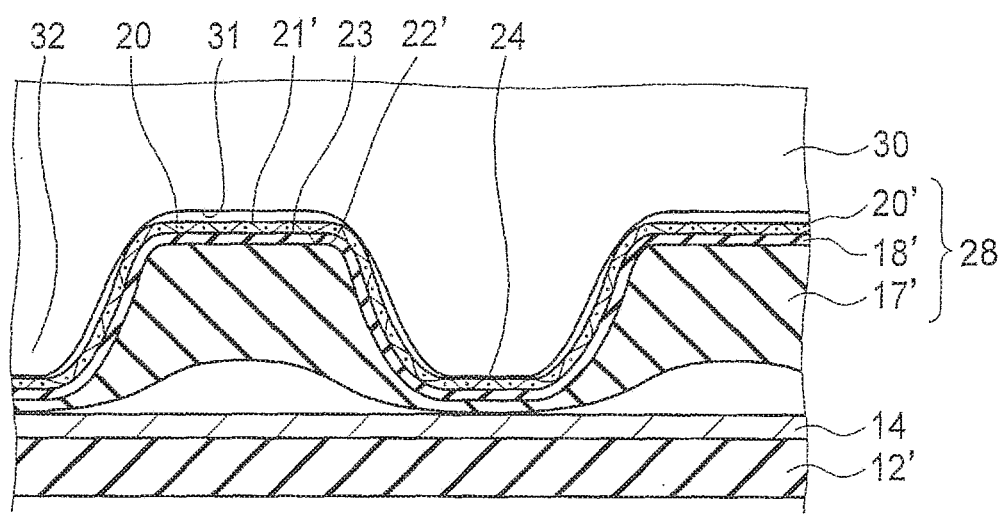
FIG. 2 is a cross-sectional view showing a method of manufacturing a toothed belt according to the embodiment of the first aspect of the present invention.

Next, a method of manufacturing a toothed belt 10 of this embodiment is described based on FIG. 2. The facing fabric 20, which is subjected to the RFL treatment and has one surface 21' (the outer surface 21) coated with the first epoxy resin solution as described above, is first preformed by a conventionally known method into a corrugated shape having an alternating tooth portion 23 and tooth bottom portion 24.

Subsequently, a tooth surface rubber sheet 18' and a core rubber sheet 17' are adhered under pressure, in this order, onto the other surface 22' of the facing fabric 20 having the corrugated shape. Thus, a rubber-provided facing fabric 28 is obtained. At this time, the tooth surface rubber sheet 18' and the core rubber sheet 17' are pressed against the facing fabric 20. Hence, the tooth surface rubber sheet 18' and the core rubber sheet 17' adhered under pressure are relatively thick on the tooth portion 23 and relatively thin on the tooth bottom portion 24.

Afterward, the rubber-provided facing fabric 28 is wound around a toothed mold 30. The toothed mold 30 has a cylindrical shape, and has an outer peripheral surface on which recessed portions 31 and raised portions 32 are alternately provided along the circumferential direction. Each tooth portion 23 of the rubber-provided facing fabric 28 is disposed inside the corresponding recessed portion 31. Note that, in general, each tooth portion 23 of the rubber-provided facing fabric 28 has a shape which is does not fit exactly to the recessed portion 31, so that a space exists between the tooth portion 23 and the recessed portion 31.

Subsequently, the cord 14 is spirally wound around the core rubber sheet 17', and a backing rubber sheet 12' is further wound around the cord 14. Afterward, the toothed mold 30 is housed in a vulcanization chamber (not illustrated). Note that the backing rubber sheet 12', the core rubber sheet 17', and the tooth surface rubber sheet 18' are unvulcanized rubber sheets to be the converted into backing rubber portion 12, the core rubber portion 17, and the tooth surface rubber portion 18, respectively, after the vulcanization and molding.

In the vulcanization chamber, the preformed rubber-provided facing fabric 28 and the like that are wound around the toothed mold 30 are heated with steam, for example, and are pressurized from the outside to the inside with a vulcanization bag or the like provided in the vulcanization chamber. As a result of the pressurization and heating, the spaces inside the recessed portions 31 are completely eliminated, and the facing fabric 20, the rubber sheets 12', 17', and 18', and the cord 14 are integrated with each other by vulcanization of the rubber sheets 12', 17', and 18', and the like. Thus, a belt slab is obtained. In addition, as a result of this heating, the first epoxy resin coated on the one surface 21' of the facing fabric 20 is hardened by the first hardener, and a coating of a hardened material of the first epoxy resin is formed. The belt slab is demolded from the toothed mold 30, subjected to grounding or the like, as appropriate, and then cut into a piece having a predetermined width. Thus, a toothed belt 10 (see FIG. 1) is formed.

As described above, in the embodiment of the first aspect of the present invention, the outer surface 21 of the facing fabric 20 is covered with the hardened material of the first epoxy resin. Hence, the outer surface 21 has a favorable frictional coefficient even under high-temperature conditions, and the wear resistance of the facing fabric 20 in a high-temperature environment can be improved. Moreover, the coating of the facing fabric 20 with the hardened material of the first epoxy resin improves the strength of the facing fabric 20 and reduces the internal heat generation due to deformation of the tooth portion 15. Accordingly, it is possible to obtain a satisfactory belt lifetime, and particularly a satisfactory belt lifetime under high-temperature and high-load conditions.

Moreover, since the outer surface 21 is covered with the hardened material of the first epoxy resin, the oil resistance of the belt is also improved, so that a satisfactory belt lifetime of the belt 10 can be obtained also when the belt 10 is used in applications involving the presence of oil. Furthermore, since the hardened material of the first epoxy resin is not applied to the inner-facing surface side of the facing fabric 20 to be adhered to the belt body 13, the adhesion between the belt body 13 and the facing fabric 20 is not declined by the hardened material of the first epoxy resin.

Note that, in this embodiment, the facing fabric 20 may be subjected to impregnation treatment with rubber cement instead of the RFL treatment. However, the facing fabric 20 is preferably subjected to the RFL treatment, in consideration of the adhesion with the first epoxy resin.

In addition, the first epoxy resin solution is coated onto the facing fabric 20 before the facing fabric 20 is preformed into a corrugated shape. Alternatively, the first epoxy resin solution may be coated after the preforming (for example, the rubber sheets are adhered under pressure onto the facing fabric).

Moreover, the structure of the toothed belt is not limited to that of FIG. 1. For example, the tooth surface rubber portion 18 may be eliminated, or an adhesive rubber portion or the like in which the cord 14 is embedded may be provided between the core rubber portion 17 and the backing rubber portion 12. In addition, the facing fabric 20 does not necessarily have to be preformed. However, once the facing fabric 20 is preformed, the elongated portion of the facing fabric is reduced during vulcanization and molding. Hence, the hardened material of the first epoxy resin can be uniformly applied more easily onto the facing fabric 20.

<Embodiment of the Second Aspect of the Invention>

Figure 3:
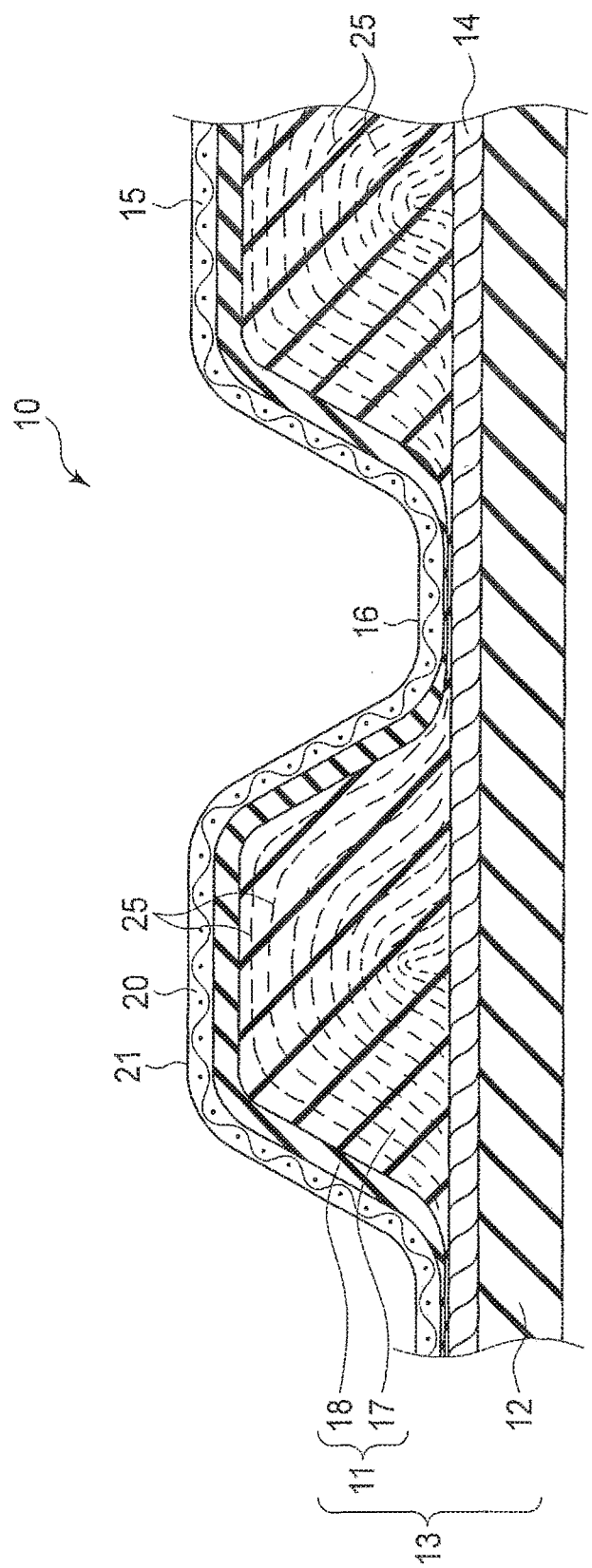
FIG. 3 is a cross-sectional view of a toothed belt according to an embodiment of the second aspect of the present invention.
Figure 4:
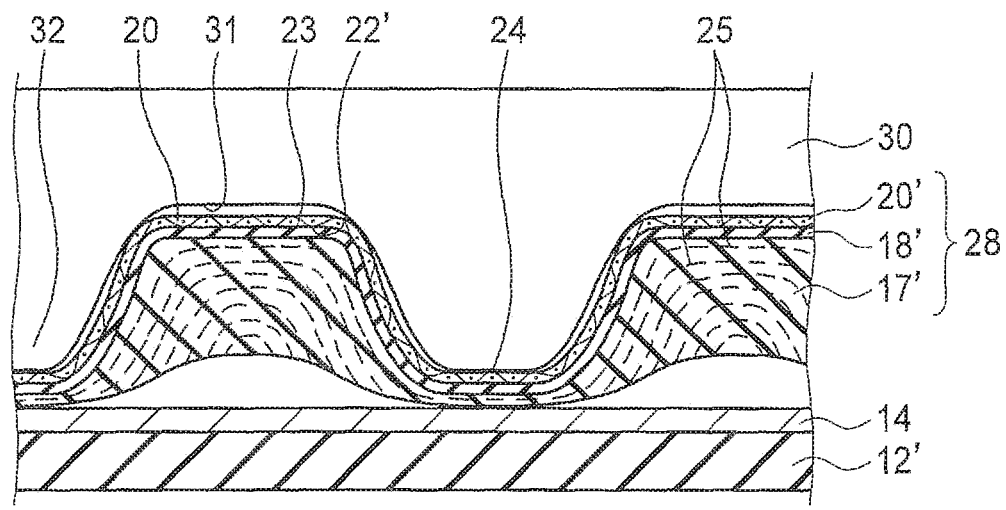
FIG. 4 is a cross-sectional view showing a method of manufacturing a toothed belt according to the embodiment of the second aspect of the present invention.

Next, a toothed belt of an embodiment of the second aspect of the present invention is described based on FIGS. 3 and 4. The same portions as those in the embodiment of the first aspect of the present invention are denoted by the same reference numbers.

FIG. 3 shows a toothed belt of the embodiment of the second aspect of the present invention. The toothed belt 10 is formed in an endless shape, and is used, for example, by being wound around driven and driving pulleys (not illustrated) in an internal combustion engine or the like. The toothed belt 10 is a timing belt that transmits torque (driving force) from a driving pulley to a driven pulley by synchronous power transmission.

The toothed belt 10 includes a belt body 13 and a cord 14. The belt body 13 is formed of a tooth rubber portion 11 provided on one surface side and a backing rubber 12 provided on the other surface side; the tooth rubber portion 11 and backing rubber 12 are integrated with each other. The cord 14 is spirally wound and embedded in a boundary portion between the tooth rubber portion 11 and the backing rubber 12, while extending in the longitudinal direction of the belt.

In the tooth rubber portion 11, a tooth portion 15 and a tooth bottom portion 16 are alternately formed on one surface side of the belt body 13 along the longitudinal direction of the belt. The tooth rubber portion 11 includes a core rubber portion 17 and a tooth surface rubber portion 18. The core rubber portion 17, which occupies for a large proportion of the tooth portion 15, is laminated on the backing rubber 12 and has a shape matching the shape of the tooth portion 15. The tooth surface rubber portion 18, which is thin, is laminated on the core rubber portion 17 and disposed on a surface of the tooth rubber portion 11. A facing fabric 20 covering the tooth rubber portion 11 is adhered onto a surface of the tooth surface rubber portion 18 (i.e., one surface of the belt body 13).

A short fiber 25, which is made of a nylon fiber, a modified nylon fiber obtained by modification of nylon, an aramid fiber, or the like, and which has a fiber length of about 0.5 to 10.0 mm, is loaded in the core rubber portion 17; whereas short fiber is not loaded in either of the tooth surface rubber portion 18 or the backing rubber 12. For this reason, the modulus of the core rubber portion 17 is higher than those of the tooth surface rubber portion 18 and the backing rubber 12. Note that an aramid short fiber is preferably loaded in the core rubber portion 17, to further improve the strength of the tooth rubber portion 11.

In the core rubber portion 17, the short fiber 25 is oriented substantially in the thickness direction of the belt in a central region of the tooth portion 15. As the short fiber 25 approaches the tooth surface from the central region, the short fiber 25 is orientated with an inclination from the thickness direction so as to extend along the tooth surface. The short fiber 25 is orientated substantially along the longitudinal direction of the belt near a top portion of the tooth portion 15 and near the tooth bottom portion 16.

The tooth surface rubber portion 18 is obtained by vulcanizing and molding a rubber composition including rubber and various additives. The rubber composition includes hydrogenated nitrile rubber (HNBR) as the main component of the rubber, and may include other rubber components such as hydrogenated carboxylic nitrile rubber (HXNBR) and nitrile rubber (NBR).

The rubber composition used to mold the tooth surface rubber portion 18 may include a metal $\alpha,\beta$-ethylenic unsaturated carboxylate as the matrix, in addition to the above-described rubbers. The metal $\alpha,\beta$-ethylenic unsaturated carboxylate is included, for example, in an amount of about 0.2 to 0.4 relative to the matrix (the total weight of the rubber and the metal $\alpha,\beta$-ethylenic unsaturated carboxylate).

The metal $\alpha,\beta$-ethylenic unsaturated carboxylate is formed by ionic bonding of an $\alpha,\beta$-ethylenic unsaturated carboxylic acid with a metal. For example, a monocarboxylic acid such as acrylic acid or methacrylic acid, or a dicarboxylic acid such as maleic acid, fumaric acid, itaconic acid, or citraconic acid is used as the $\alpha,\beta$-ethylenic unsaturated carboxylic acid. Preferably, methacrylic acid is used. For example, zinc, magnesium, calcium, barium, titanium, chromium, iron, cobalt, nickel, aluminum, tin, lead, or the like is used as the metal, and zinc is preferably used. Thus, for example, zinc dimethacrylate is used as the metal salt.

The rubber composition used to mold the tooth surface rubber portion 18 preferably further includes resorcinol and a melamine compound as internal adhesive agents. In this embodiment, these compounds are incorporated in the tooth surface rubber portion 18. Hence, from the heating during vulcanization, or the like, the melamine compound and resorcinol are polymerized and a network structure is constructed. As a result, the tear strength and the like of the surface of the tooth rubber portion 11 are enhanced. Moreover, this enhances the adhesion strength of the tooth surface rubber portion 18 to the facing fabric 20, which has been subjected to impregnation treatment with an epoxy-rubber treatment agent composition to be described later.

The melamine compound is, for example, a melamine compound of which at least a part of amino groups is methoxymethylated. Specific examples of the melamine compound used include hexamethoxymethylolmelamine compounds such as hexamethoxymethylolmelamine, partial condensate oligomers thereof, and mixtures thereof. The melamine compound preferably has a viscosity at 25° C. (according to DIN19268) of about 3000 to 8000 mPa·s.

Resorcinol is incorporated in an amount of 0.3 to 8 parts by weight, preferably 0.5 to 4.5 parts by weight, and more preferably 1.5 to 3.0 parts by weight, relative to 100 parts by weight of the matrix of the rubber composition. In addition, the incorporated parts (weight) of the melamine compound are preferably smaller than those of resorcinol, and the melamine compound is incorporated in an amount of 0.2 to 5 parts by weight, preferably 0.3 to 2.7 parts by weight, and more preferably 0.9 to 1.8 parts by weight, relative to 100 parts by weight of the matrix of the rubber composition. If the incorporated amount of any of the melamine compound and resorcinol exceeds the above-described range, tear strength, breaking strength, and the like tend to be poor. On the other hand, if the incorporated amount is lower than the above-described range, the adhesion strength is hard to improve.

The rubber composition used to mold the tooth surface rubber portion 18 preferably includes silica. Silica in the form of fine particles, powder, or the like is used as the silica. In this embodiment, water contained in the silica causes the melamine compound to donate formaldehyde, resorcinol is polymerized with the formaldehyde, and the melamine compound is also polymerized. As a result, satisfactory adhesive force, tear strength, and the like are obtained as described above. The silica is in an amount of 5 to 50 parts by weight, and preferably 20 to 40 parts by weight, relative to 100 parts by weight of the matrix of the rubber composition.

The rubber composition used to form the tooth surface rubber portion 18 further includes known additives for rubber such as a vulcanizing agent, a plasticizer, a lubricant, and carbon black. In this embodiment, an organic peroxide-based vulcanizing agent is preferably used as the vulcanizing agent.

The rubber composition used to mold the tooth surface rubber portion 18 is prepared as follows. First, additives such as silica for the rubber composition other than the vulcanizing agent and the internal adhesive agents (resorcinol and the melamine compound) are kneaded with the rubber, preferably at a temperature higher than the temperature in the primary kneading described below. Subsequently, the internal adhesive agents are added and the mixture is further kneaded (primary kneading). In this primary kneading, the kneading temperature is preferably 100° C. or higher. This kneading at this temperature results in the release of water from the silica to the composition, and facilitates the donation of formaldehyde from the melamine compound in the above-described manner. Further, the vulcanizing agent is added to the primary kneaded mixture, and the resultant mixture is kneaded at a temperature lower than the vulcanization temperature of the vulcanizing agent (lower than the kneading temperature in the primary kneading). Thus, the rubber composition is obtained (secondary kneading). The rubber composition is shaped into a sheet, and used as the tooth surface rubber sheet 18' (see FIG. 4). However, the method of kneading the rubber is not limited to this method, and for example, the additives other than the vulcanizing agent may be added, as appropriate, in the primary kneading or the secondary kneading.

The core rubber portion 17 is formed of a rubber composition that does not include the above-described resorcinol or melamine compound, but does load the short fiber 25. The other components of the core rubber portion 17 may be the same as those of the tooth surface rubber portion 18. Moreover, the rubber component of the core rubber portion 17 is preferably mainly made of HNBR, as in the case of the tooth surface rubber portion 18. However, as a matter of course, the rubber component of the core rubber portion 17 may include other rubber components such as HXNBR and NBR.

As for the backing rubber 12, rubber used for the backing rubber of a conventionally known toothed belt may be used, and the backing rubber 12 preferably does not load the short fiber. In addition, the rubber used as the backing rubber 12 is preferably made mainly of HNBR, as in the case of the tooth rubber portion 11, and may include other rubber components, if necessary.

Although not particularly limited, the facing fabric 20 is, for example, a woven fabric including first threads (for example, weft threads) extending along the longitudinal direction of the belt and second threads (for example, warp threads) extending along the width direction of the belt; the first threads and second threads are woven. In the facing fabric 20, for example, the first threads are constituted of elastic threads, and the second threads are constituted of non-elastic threads. Thus, the facing fabric 20 is elastic in the longitudinal direction of the belt, and is more easily formed into a corrugated shape in preforming. In this embodiment, at least part of the fiber constituting the facing fabric 20 is preferably an aramid fiber to improve the strength of the belt surface, and for example, at least some of the first threads are preferably an aramid fiber.

The facing fabric 20 is subjected to impregnation treatment with a treatment liquid obtained by diluting an epoxy-rubber treatment agent composition with a dilution liquid (a solvent); the epoxy-rubber treatment agent composition includes a second epoxy resin (prepolymer), a second hardener for hardening the second epoxy resin, and a rubber component. The rubber component included in the treatment agent composition is preferably latex. The solvent used for diluting the treatment agent composition is preferably water. However, the dilution solvent may be an organic solvent such as toluene, MEK (methyl ethyl ketone), or the like, and the treatment liquid may be a liquid obtained by diluting the epoxy-rubber treatment agent composition with an organic solvent; where the epoxy-rubber treatment agent composition includes an unvulcanized rubber polymer, the second epoxy resin, and the second hardener. In addition, the epoxy-rubber treatment agent composition may include a vulcanizing agent for vulcanizing the rubber component included in the composition. When the facing fabric is subjected to impregnation treatment with the treatment liquid including the vulcanizing agent, the rubber component is vulcanized with the vulcanizing agent by the heating during vulcanization of the rubber, which is described later. Hence, the resistance to oil-swelling and heat resistance of the facing fabric are further improved.

The impregnation treatment is carried out by, for example, immersing the facing fabric in the treatment liquid, and then drying the facing fabric by heat to evaporate the solvent such as water. The heating is preferably carried out at a relatively high temperature in a short period in order to gasify the solvent while limiting, as much as possible, the hardening of the second epoxy resin during the drying by heat. For example, the heating here is carried out at a temperature higher than the heating temperature in the vulcanization to be described later. The second epoxy resin adhered to the facing fabric 20 is a thermosetting epoxy resin that is hardened with the hardener by heating during the vulcanization of the rubber, to be described later. Thus, a coating of the hardened material of the second epoxy resin and the rubber component such as latex is formed on a surface of the facing fabric 20.

Examples of the second epoxy resin included in the epoxy-rubber treatment agent composition include bisphenol A epoxy resin, bisphenol F epoxy resin, novolak-type epoxy resin, biphenyl-type epoxy resin, phenoxy-type epoxy resin, aliphatic epoxy resin, and the like. One of these second epoxy resins alone or a combination of two or more thereof may be used. Note that the second epoxy resin preferably has a number average molecular weight of 300 or higher. Here, the number average molecular weight is a value measured with a gel permeation chromatograph (GPC) and converted into that of polystyrene.

When the solvent for diluting the epoxy-rubber treatment agent composition is water, the second epoxy resin is preferably water-soluble. In this case, the second epoxy resin dissolves in the treatment liquid, so that a favorable handleability of the treatment liquid is achieved, which facilitates the formation of a uniform coating. For example, in the second epoxy resins indicated above as examples, the aliphatic epoxy resin is often water-soluble, and in general dissolves in a treatment liquid that includes water as the solvent.

Meanwhile, the aliphatic epoxy resin makes it easier to obtain an appropriate hardness of the coating of the hardened material, and hence makes it possible to easily improve the durability of the belt while enhancing the adhesion with the tooth rubber. Examples of the aliphatic epoxy resin include polyglycerin-based aliphatic epoxy resins such as polyglycerol polyglycidyl ethers. Moreover, the second epoxy resin preferably has three or more functional groups (epoxy groups), so that a network structure can be constructed by the hardening with the second hardener.

The weight ratio (solid component weight ratio) of the second epoxy resin to the rubber component in the epoxy-rubber treatment agent composition is, for example, 9:1 to 1:9, and preferably 7:3 to 3:7 in terms of second epoxy resin:rubber component. Moreover, for example, when the second epoxy resin is of the aliphatic-type described above, the incorporated weight of the second epoxy resin is preferably not less than the incorporated weight of the rubber component in order to obtain an appropriate hardness of the facing fabric 20 and satisfactory adhesion performance. On the other hand, when the second epoxy resin is of the aromatic-type such as the novolak type, the facing fabric 20 tends to be rigid with a small amount of the second epoxy resin. Hence, to obtain an appropriate hardness of the coating and satisfactory adhesion performance thereof, the incorporated weight of the second epoxy resin is preferably not more than the incorporated weight of the rubber component.

The second hardener included in the epoxy-rubber treatment agent composition may be any, as long as the second epoxy resin can be hardened. For example, an imidazole-based hardener, which is a catalytic hardener, is preferably used. A catalytic hardener polymerizes the second epoxy resin by catalytic direct reaction of epoxy rings. In addition, the second hardener is preferably soluble in water, and dissolved in the treatment liquid as in the case of the second epoxy resin.

In addition, although the rubber component included in the epoxy-rubber treatment agent composition is not particularly limited, NBR, HNBR, or HXNBR is preferably used as the rubber component in order to improve the adhesion with the tooth surface rubber portion 18 composed of HNBR. In other words, NBR latex, HNBR latex, or HXNBR latex is preferably used.

Moreover, although the vulcanizing agent for vulcanizing the rubber component included in the epoxy-rubber treatment agent composition is not particularly limited, an amine-based vulcanizing agent, a peroxide vulcanizing agent, or a sulfur-based vulcanizing agent is preferably used as the vulcanizing agent to improve the resistance to oil-swelling and heat resistance of the facing fabric.

In addition, the adhesion amount (solid component) of the epoxy-rubber treatment agent to the facing fabric 20 is, for example, 5 to 200 g/m$^2$, and preferably 20 to 100 g/m$^2$. An adhesion amount of less than 5 g/m$^2$ produces poor results in terms of improving the performance of the belt with respect to water resistance, heat resistance and oil resistance. An adhesion amount exceeding 200 g/m$^2$ results in excessive rigidity of the facing fabric that leads to the formation of fabric cracks and deterioration in the bending performance of the cord.

Next, a method of manufacturing a toothed belt 10 of this embodiment is described based on FIG. 4. The facing fabric 20 subjected to the impregnation treatment with the epoxy-rubber treatment agent composition as described above is first preformed by a conventionally known method into a corrugated shape having an alternating tooth portion 23 and tooth bottom portion 24.

Subsequently, a tooth surface rubber sheet 18' and a core rubber sheet 17' are adhered under pressure, in this order, onto one surface 22' of the facing fabric 20 having the corrugated shape. Thus, a rubber-provided facing fabric 28 is obtained. At this time, the tooth surface rubber sheet 18' and the core rubber sheet 17' are pressed against the facing fabric 20. Hence, the tooth surface rubber sheet 18' and the core rubber sheet 17' adhered under pressure are relatively thick on the tooth portion 23 and relatively thin on the tooth bottom portion 24. Note that the short fiber 25 loaded in the core rubber sheet 17', which has been incorporated along the longitudinal direction, is inclined as appropriate during the adhering under pressure, as is apparent in FIG. 2, and is oriented in substantially the same manner as that of the short fiber in the toothed belt 10.

Afterward, the rubber-provided facing fabric 28 is wound around a toothed mold 30. The toothed mold 30 has a cylindrical shape with an outer peripheral surface on which recessed portions 31 and raised portions 32 are alternately provided along the circumferential direction. Each tooth portion 23 of the rubber-provided facing fabric 28 is disposed inside the corresponding recessed portion 31. Note that, in general, each tooth portion 23 of the rubber-provided facing fabric 28 has a shape that does not fit exactly to the recessed portion 31, so that a space exists between the tooth portion 23 and the recessed portion 31.

Subsequently, the cord 14 is spirally wound around the core rubber sheet 17', and a backing rubber sheet 12' is further wound around the cord 14. Afterward, the toothed mold 30 is housed in a vulcanization chamber (not illustrated). Note that the backing rubber sheet 12', the core rubber sheet 17', and the tooth surface rubber sheet 18' are unvulcanized rubber sheets to be converted into the backing rubber 12, the core rubber portion 17, and the tooth surface rubber portion 18, respectively, after vulcanization and molding.

In the vulcanization chamber, the rubber-provided facing fabric 28 and the like that are wound around the toothed mold 30 are heated with steam, for example, and pressurized from the outside to the inside with a vulcanization bag or the like provided in the vulcanization chamber. As a result of the pressurization and heating, the spaces inside the recessed portions 31 are completely eliminated, and the facing fabric 20, the rubber sheets 12', 17', and 18', and the cord 14 are integrated with each other by vulcanization of the rubber sheets 12', 17', and 18', and the like. Thus, a belt slab is obtained. In addition, as a result of this heating, the second epoxy resin (prepolymer) in the epoxy-rubber treatment agent composition adhered to the facing fabric 20 is hardened by the second hardener, and the rubber component therein is preferably vulcanized by the vulcanizing agent in the composition. Thus, the facing fabric 20 is coated with the hardened material of the second epoxy resin and the vulcanized rubber component. The belt slab is demolded from the toothed mold 30, subjected as appropriate to grinding or the like, and then cut into a piece having a predetermined width. Thus, a toothed belt 10 (see FIG. 3) is obtained.

As described above, in the embodiment of the second aspect of the present invention, the facing fabric 20 is covered with the second epoxy resin-rubber component, so that the water resistance, heat resistance, oil resistance, and wear resistance of the facing fabric are enhanced. Hence, the toothed belt has satisfactory durability, even when used under high-temperature and high-load conditions or in a water or oil environment. In addition, the predetermined internal adhesive agents are incorporated in the tooth surface rubber portion 18 to which the facing fabric 20 is adhered. Hence, the adhesion strength of the tooth rubber portion 11 to the facing fabric 20 coated with the second epoxy resin-rubber component is further improved, and the durability of the belt can be further improved.

Note that, in this embodiment, the outer surface 21 of the facing fabric 20, i.e., the surface on the side opposite to the surface adhered to the tooth surface rubber portion 18, may be further coated with a hardened material of a third epoxy resin as shown below.

The coating of the hardened material of the third epoxy resin is formed as follows. Specifically, a third epoxy resin liquid obtained by diluting the third epoxy resin (prepolymer) and a third hardener with a solvent or the like is coated onto the outer surface of the facing fabric 20. Then, the third epoxy resin is hardened by the heat from the above-described vulcanization molding process. The solvent included in the third epoxy resin liquid coated onto the facing fabric 20 is preferably evaporated before vulcanization by natural drying or the like. Note that the third epoxy resin liquid is coated onto the facing fabric that has already been subjected to the impregnation treatment with the above-described epoxy-rubber treatment agent composition.

Examples of the third epoxy resin include bisphenol A epoxy resin, bisphenol F epoxy resin, novolak-type epoxy resin, biphenyl-type epoxy resin, phenoxy-type epoxy resin, aliphatic epoxy resin, and the like. One of these third epoxy resins alone or a combination of two or more thereof may be used. In these epoxy resins, bisphenol A epoxy resin or novolak-type epoxy resin is preferable as the third epoxy resin.

The third epoxy resin (prepolymer) is preferably of a so-called solid type with a melting point higher than normal temperature (25° C.). The use of a solid type results in good handleability of the third epoxy resin liquid because the third epoxy resin liquid coated onto the yet-unhardened facing fabric 20 is less likely to be tacky, once the solvent has evaporated. However, the melting point of the third epoxy resin is preferably lower than the heating temperature during vulcanization, because the third epoxy resin is difficult to harden when not melted.

In addition, to obtain satisfactory heat resistance of the hardened material of the third epoxy resin, the epoxy equivalent of the third epoxy resin according to JIS K 7236 is preferably 100 to 7000 g/eq, and more preferably 150 to 5000 g/eq.

The third epoxy resin is hardened by a third hardener. Examples of the third hardener include amine-based hardener, acid anhydride-based hardener, phenol novolak-based hardener, imidazole-based hardener, dicyandiamide-based hardener, and the like. One of these third hardeners, one or a combination of two or more thereof may be used.

In these hardeners, the imidazole-based hardener, which is a catalytic hardener, is preferable as the third hardener. The imidazole-based hardener, which is a catalytic hardener, polymerizes the epoxy resin by the catalytic direct reaction of epoxy rings. Hence, the hardness of the hardened material can be easily increased, and thus the frictional coefficient of the outer surface 21 of the facing fabric 20 can be easily reduced. In addition, the added amount of the imidazole-based hardener can be small. This small amount results in good handleability of the third epoxy resin liquid, because the third epoxy resin liquid coated onto the yet-unhardened facing fabric 20 is less likely to be tacky once the solvent has evaporated.

Although not particularly limited, the hardened material of the third epoxy resin preferably has a relatively high softening point, in order to achieve satisfactory wear resistance of the facing fabric 20 by maintaining high hardness even at a high temperature, and thus providing the tooth surface with a satisfactory frictional coefficient. Specifically, the softening point is preferably 110° C. or higher. Note that the softening point is measured by using a thermomechanical analyzer "TMA/SS120U" (manufactured by SII Nano-Technology Inc.) under the following conditions: measuring temperature range: 30° C. to 350° C.; load: 100 mN; and temperature rise: 5° C./minute.

If the hardened material of the third epoxy resin is too thick, cracks or the like may occur, from which tooth cracks may be started. For this reason, the adhesion amount (solid component) of the third epoxy resin liquid (i.e., the hardened material of the third epoxy resin) to the facing fabric 20 is preferably relatively small, for example about 10 to 50 g/m². In addition, the facing fabric 20 is usually a woven fabric, and has an uneven surface due to the weave texture. The adhesion amount is preferably such that unevenness is left on the surface (the outer surface 21) even after the surface is covered with the hardened material. If the outer surface 21 covered with the hardened material of the third epoxy resin has unevenness originating from the unevenness of the weave texture, it is highly likely that noise generated during operation can be prevented, especially when the belt is used in a state where the belt (the facing fabric 20) is not in contact with oil.

As described above, the outer surface 21 of the facing fabric 20 is covered with the hardened material of the third epoxy resin in this embodiment. In this case, the outer surface has a favorable frictional coefficient even under high-temperature conditions, and the wear resistance of the facing fabric 20 in a high-temperature environment can be improved. Moreover, the coating of the hardened material of the third epoxy resin improves the strength of the facing fabric 20 and reduces the internal heat generated by the deformation of the tooth portion 15. Accordingly, it is possible to further improve the durability of the belt, particularly in a high-temperature and high-load environment.

Moreover, since the outer surface 21 is covered with the hardened material of the third epoxy resin, the oil resistance of the belt is also improved, so that the durability of the belt 10 can be further improved when the belt 10 is operated in the presence of oil. Furthermore, since the hardened material of the third epoxy resin is not applied to the inner surface side of the facing fabric 20 to be adhered to the belt body 13, the adhesion between the belt body 13 and the facing fabric 20 is not decreased by the hardened material of the third epoxy resin. On the other hand, the third epoxy resin liquid is applied onto the facing fabric 20 subjected to the impregnation treatment with the epoxy-rubber treatment agent composition. Hence, the adhesion of the coating of the hardened material of the third epoxy resin to the facing fabric 20 tends to be satisfactory.

In addition, the structure of the toothed belt 10 in this embodiment is not limited to that of FIG. 3. For example, a short fiber may also be loaded in the tooth surface rubber portion 18, or the short fiber does not necessarily have to be loaded in the core rubber portion 17.

Moreover, the tooth surface rubber portion 18 may be eliminated, and the tooth rubber may be formed of only the core rubber portion 17. In this case, however, it is preferable that the above-described internal adhesive agents (resorcinol and the melamine compound) be incorporated in the core rubber portion 17. As a matter of course, the above-described two internal adhesive agents do not necessarily have to be incorporated in the tooth surface rubber portion 18 or the core rubber portion 17 adhered to the facing fabric.

Moreover, an adhesive rubber portion or the like in which the cord 14 is embedded may be provided between the core rubber portion 17 and the backing rubber 12. In addition, the facing fabric 20 does not necessarily have to be preformed.

Note that in the above-described embodiment the rubber constituting each of the core rubber portion 17, the tooth surface rubber portion 18, and the backing rubber 12 may include rubber components such as EPDM (ethylene-propylene-diene copolymer), other than HNBR, NBR, and HXNBR described above, or may include a rubber component other than HNBR as the main component.

EXAMPLES

Hereinafter, specific examples of the first and second aspects of the present invention are described below. However, the first and second aspects of the present invention are not limited to the examples shown below.

First, examples of the embodiment of the first aspect of the present invention are shown.

Example 1

First, a woven fabric in which the warp threads and the weft threads are woven into a 2/2 twill was prepared as the facing fabric. The warp threads were non-elastic threads composed of 110-dtex nylon filament yarns. The weft threads were elastic threads composed of composite yarns in which intermediate yarns made of 220-dtex para-aramid fiber yarns (product name: Technora) were wound around core yarns made of 470-dtex urethane elastic yarns, and cover yarns made of 110-dtex nylon fiber were further wound around the intermediate yarns. In a step described later, the warp threads were extended along the width direction of the belt, and the weft threads were extended along the longitudinal direction of the belt.

RFL treatment was conducted by immersing the facing fabric in an RFL treatment liquid [RF/latex (weight ratio)=1/6, latex component:HNBR latex], and then drying the facing fabric (at a temperature of 160° C. for 5 minutes). The adhesion amount (solid component) of RFL to the facing fabric was 80 g/m$^2$.

Next, an epoxy resin liquid was prepared by further adding 3 parts by weight of an imidazole-based hardener to 100 parts by weight of a novolak-type epoxy resin (epoxy equivalent: 210 g/eq) that had been diluted with 500 parts by weight of MEK (methyl ethyl ketone). The epoxy resin liquid was applied by air-spray coating onto one surface of the facing fabric subjected to RFL treatment, so that an adhesion amount (solid component) of 20 g/m$^2$ was achieved. Afterward, the facing fabric was allowed to stand at normal temperature (25° C.) so that the MEK could evaporate.

Subsequently, unvulcanized rubber sheets formed of HNBR that did not load a short fiber were prepared as the tooth surface rubber sheet and the backing rubber sheet. In addition, an unvulcanized rubber made of HNBR loading 4 parts by weight of an aramid short fiber relative to 100 parts by weight of the rubber component was prepared as the core rubber sheet. Then, the facing fabric was preformed into a corrugated shape, and the tooth surface rubber sheet and the core rubber sheet were adhered under pressure, in this order, onto the other surface of the facing fabric, which is the surface without the epoxy resin liquid coating. Thus, a rubber-provided preformed facing fabric was obtained.

Afterward, the rubber-provided preformed facing fabric, a cord made of a glass cord, and the backing rubber sheet were wound around a toothed mold. Then, these materials were molded by vulcanization in a vulcanization chamber at a temperature of 150° C. under a predetermined pressure for 20 minutes. Thus, an RU-toothed belt slab was obtained. In Example 1, the hardened material of the epoxy resin covering the one surface (the outer surface) of the facing fabric had a softening point of 150° C.

Example 2

Example 2 was conducted in the same manner as that of Example 1, except that the epoxy resin liquid used was an epoxy resin liquid obtained by further adding 3 parts by weight of an imidazole-based hardener to 100 parts by weight of a bisphenol A epoxy resin (epoxy equivalent: 900 g/eq) that had been diluted with 500 parts by weight of a solvent MEK. In Example 2, the hardened material of the epoxy resin covering the one surface (the outer surface) of the facing fabric had a softening point of 100° C.

Comparative Example 1

Comparative Example 1 was conducted in the same manner as that of Example 1, except that an epoxy resin liquid was not coated onto the facing fabric.

[Frictional Coefficient of Tooth Surface of Belt]

Figure 5:
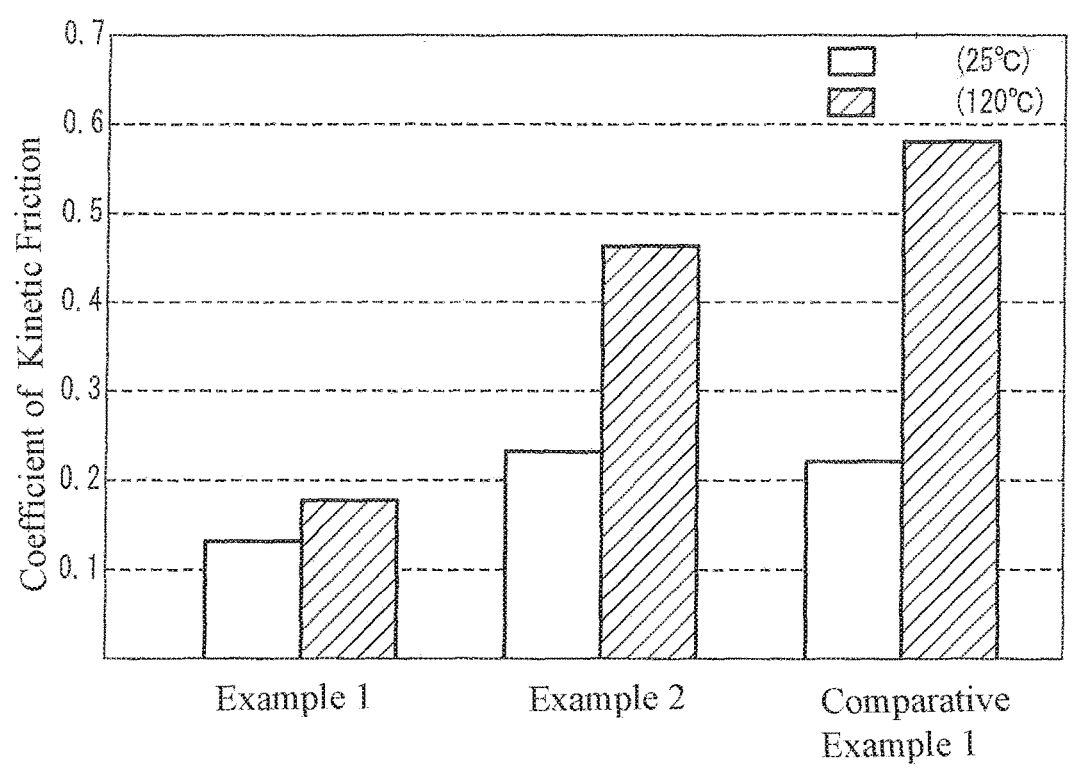
FIG. 5 is a graph showing the coefficients of kinetic friction for belts of Examples 1 and 2 and Comparative Example 1.

A portion corresponding to a single tooth was cut out from the belt having a width of 19 mm in each of Examples 1 and 2 and Comparative Example 1. The single-tooth portion was disposed on a stainless steel friction material in such a manner that the tooth top portion was in contact with the friction material. Then, the coefficient of kinetic friction was measured by moving the friction material 30 mm in the longitudinal direction of the belt at a speed of 10 mm/second with a load of 500 g being applied to the single-tooth portion of the belt. The coefficient of kinetic friction was measured with a friction coefficient measurement apparatus [HEIDON Type: 14FW (manufactured by Shinto Scientific Co., Ltd.)] in an ambient temperature of 25° C. (normal state) and an ambient temperature of 120° C. (hot state). FIG. 5 shows the measurement results.

[Drive Test]

Figure 6:
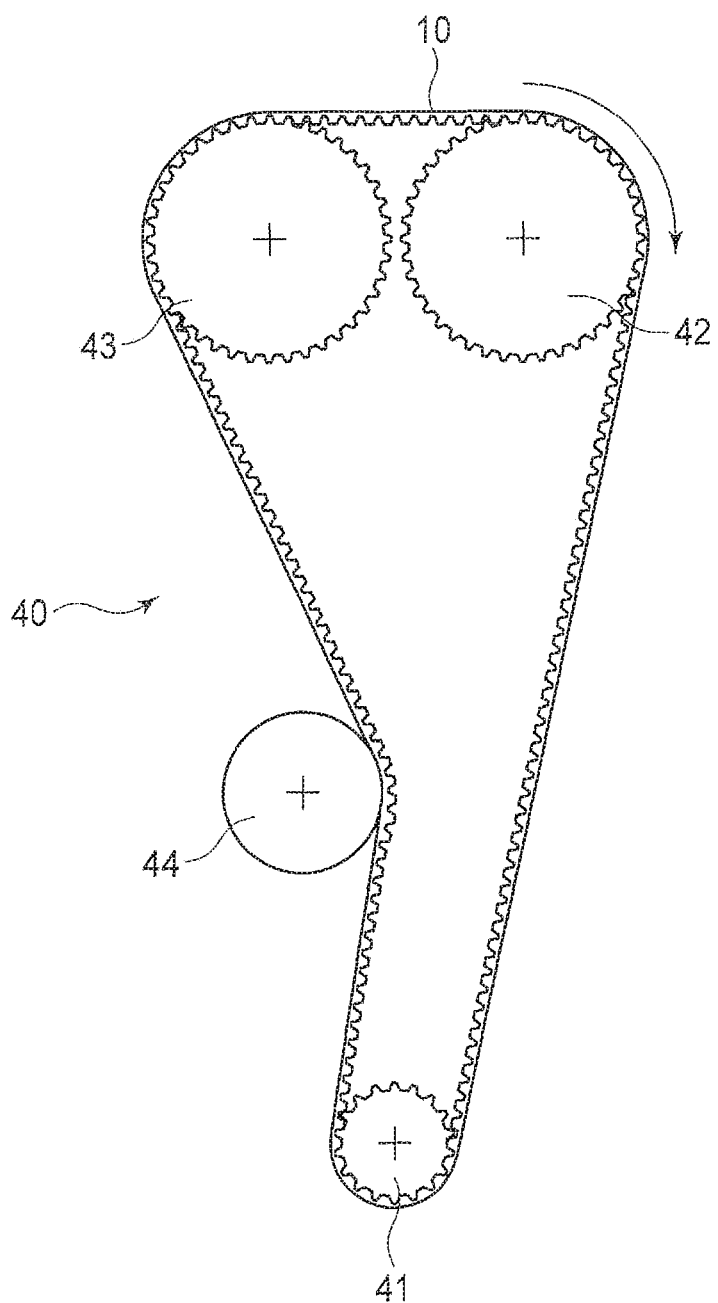
FIG. 6 is a schematic diagram showing a layout in a drive test.
Figure 7:
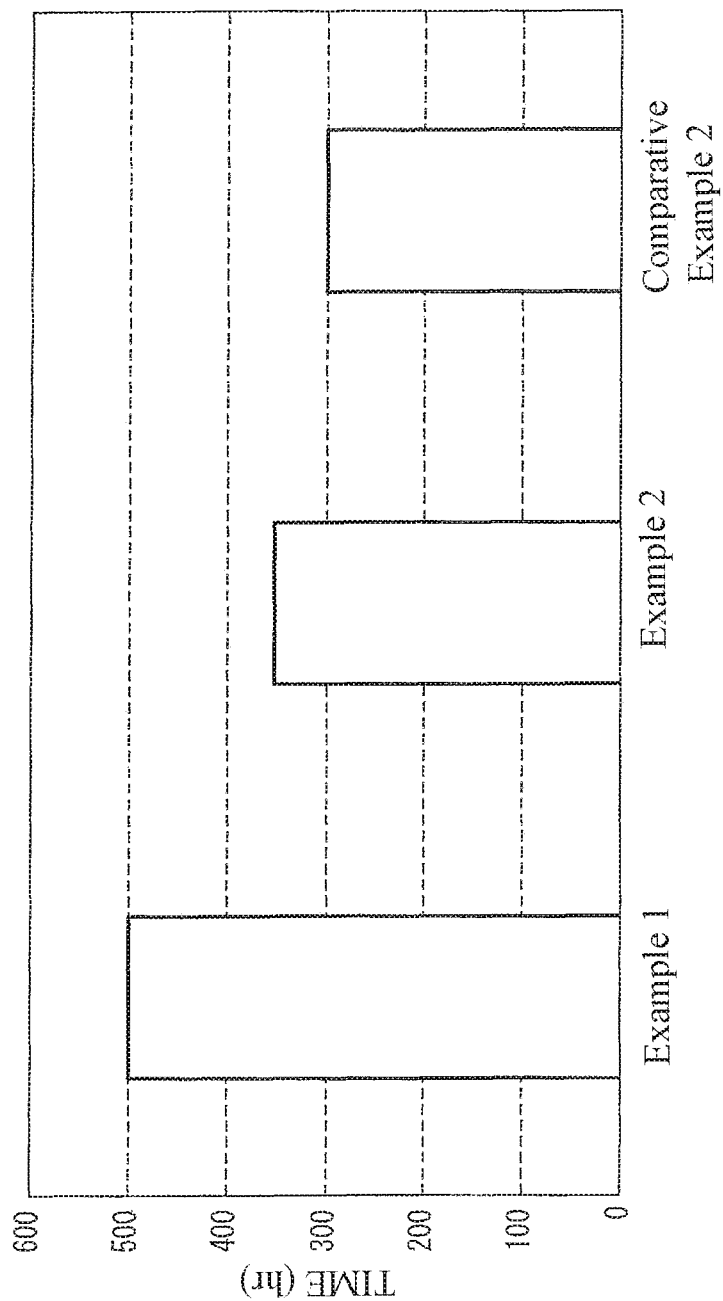
FIG. 7 is a graph showing the durability in units of time obtained from the drive test for the belts of Examples 1 and 2 and Comparative Example 1.

FIG. 6 is an example of a layout of a transmission system used in an internal combustion engine. Toothed belts having a width of 16 mm obtained from the belt slabs of Examples 1 and 2 and Comparative Example 1 were subjected to a durability test using this transmission system. The transmission system 40 had a toothed driving pulley 41 that was connected to a crankshaft and which had 20 teeth and a diameter of 60 mm, toothed driven pulleys 42 and 43 that were connected to camshafts, and each of which had 40 teeth and a diameter of 121 mm, and a flat tensioner pulley 44 having a diameter of 80 mm. The toothed belt 10 was looped around the pulleys 41 to 43. In a state in which tension was applied to the toothed belt 10 from the outer peripheral side by the tensioner pulley 44 on the slack side of the belt, the toothed belt 10 was operated at 4000 rpm under a load per single tooth of 8.4 N/mm. The test was conducted in an ambient temperature of 120° C., and the elapsed time of operation until belt failure was measured as the durability time. FIG. 7 shows the measurement results.

[Test Using ServoPulser]

Figure 8:
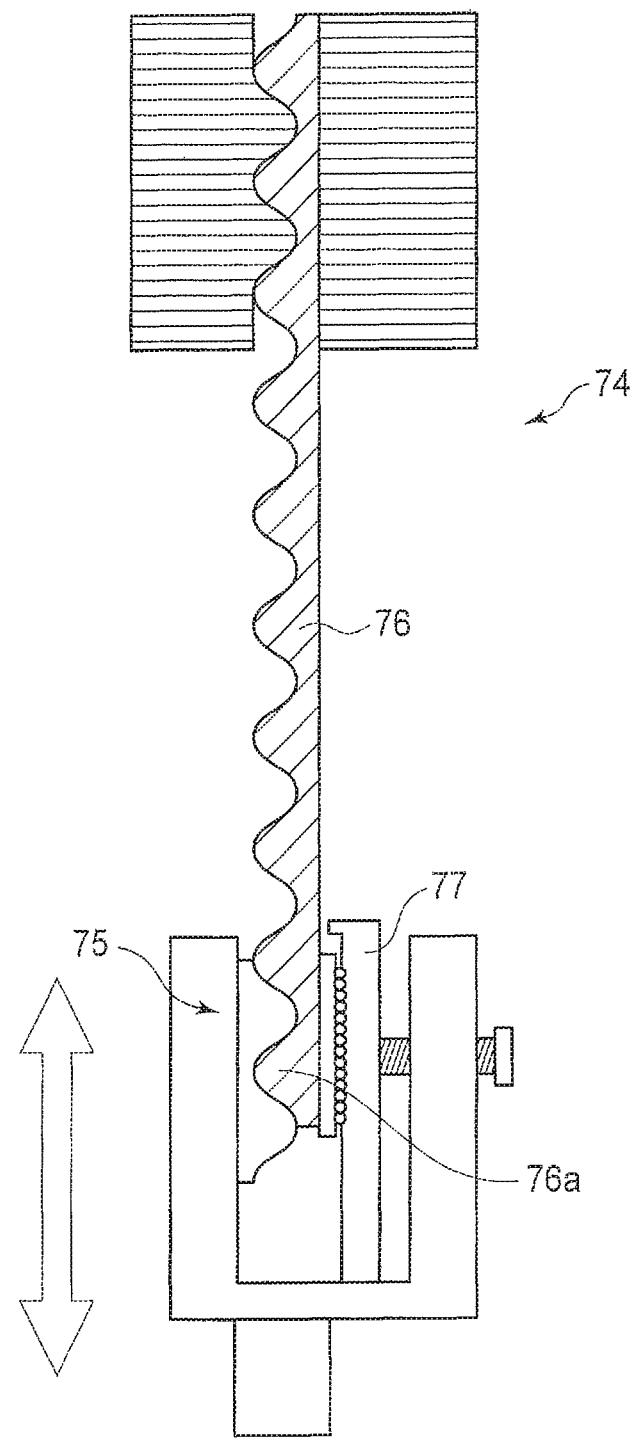
FIG. 8 is a schematic diagram showing a ServoPulser test machine.

Example 1 and Comparative Example 1 were also evaluated for durability based on a test using a ServoPulser. The test was conducted with the ServoPulser test machine 74 shown in FIG. 8. The ServoPulser test machine 74 included a metal fixture 75 having an uneven shape corresponding to the tooth shape of the toothed belt, and a clamp 77. For the evaluation test, a toothed belt having 10 teeth and a width of 20 mm was taken from each of the belt slabs to be used as a test piece 76. The test piece 76 was disposed to extend in the vertical direction. An upper end of the test piece 76 was secured in place and a single tooth 76a at the lower end of the test piece 76 was engaged with the corresponding shape of the metal fixture 75. Then, the metal fixture 75 and the lower end of the test piece 76 were sandwiched together and secured with the clamp 77 from the left and right side.

Figure 9:
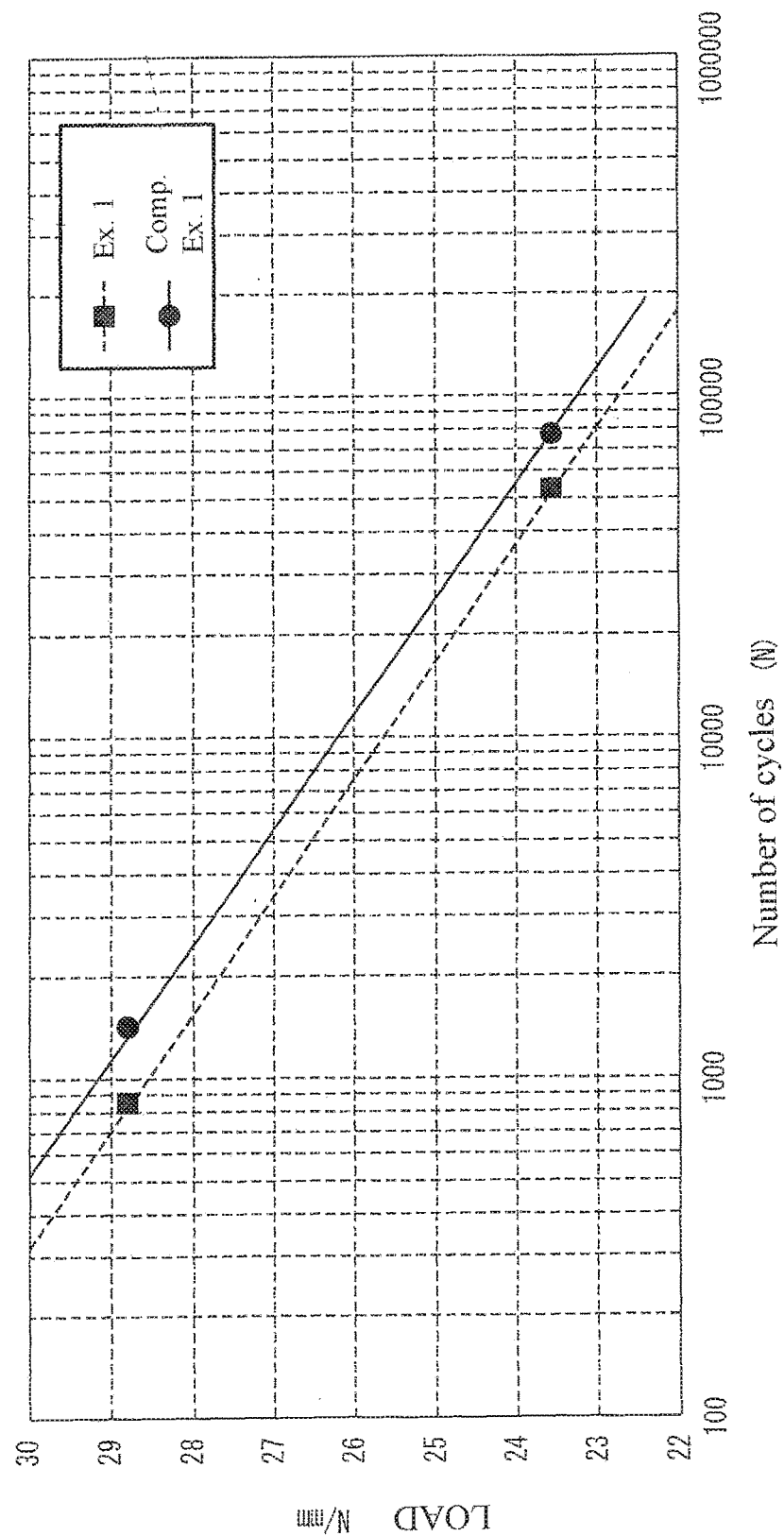
FIG. 9 is a graph showing the results of a ServoPulser test conducted on Example 1 and Comparative Example 1.

A sine wave load periodically ranging from 0 to a predetermined load was applied in the downward direction to the clamp 77 sandwiching the metal fixture 75 and the test piece 76. The frequency of the sine wave was 1 Hz. In this test, which was conducted in an ambient temperature of 120° C., the number of cycles of the sine wave was counted until breakage of the single tooth 76a. FIG. 9 shows the test results in which the horizontal axis represents the number of cycles of the applied load before breakage of the single tooth 76a and the time of breakage, and the vertical axis represents predetermined loads.

[Hysteresis Loss]

Figure 10:
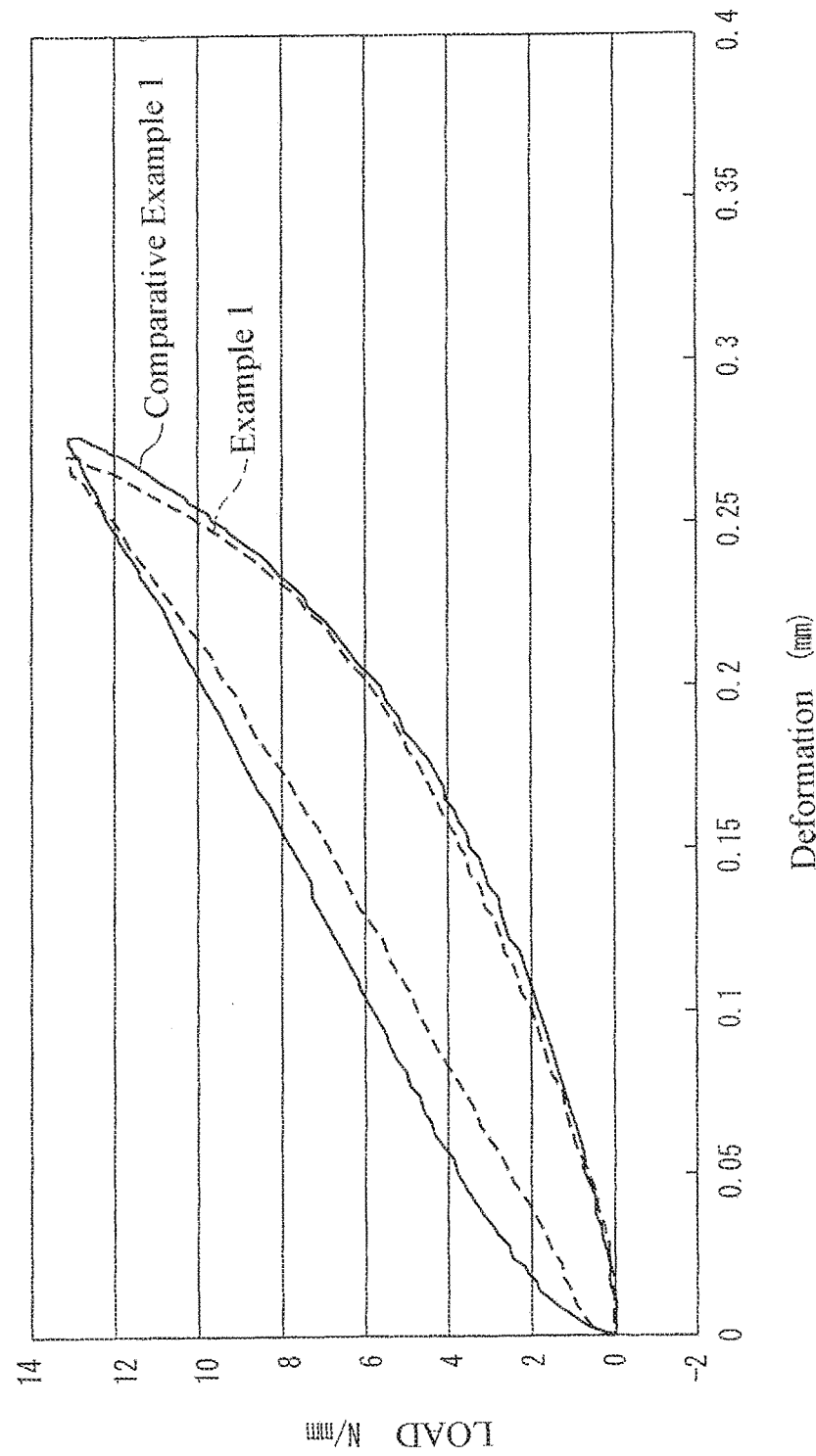
FIG. 10 is a graph showing the stress-strain curves of the belts of Example 1 and Comparative Example 1.

As for Example 1 and Comparative Example 1, a sine wave load periodically ranging from 0 to 13 N/mm was applied in an ambient temperature of 120° C. for 1 hour (3600 cycles), in the same manner as in the test using the ServoPulser. Afterward, the stress and strain in a single cycle were measured. FIG. 10 shows stress-strain curves showing the hysteresis loss in this measurement.

As is apparent from the above-described results, the frictional coefficient of Comparative Example 1 was a relatively low and satisfactory value at normal temperature. However, the frictional coefficient increased under the high-temperature condition, and was not maintained at the satisfactory value. In contrast, it is conceivable that the wear resistance of each of Examples 1 and 2 was improved as compared with that of Comparative Example 1 because the frictional coefficient of each of Examples 1 and 2 was relatively low, not only at normal temperature but also under the high-temperature condition. In addition, the hysteresis loss of Example 1 in the high-temperature environment was smaller than that of Comparative Example 1, and it can be understood that the generation of heat and the like due to the deformation of the tooth were reduced. Moreover, as is apparent from the results of the test using the ServoPulser and the durability test, the belt in each of Examples 1 and 2 had high durability in the high-temperature and high-load environment.

[Sheet Immersion Test]

A sheet of a hardened material of the epoxy resin liquid of Example 1 (hardened at 150° C. for 20 minutes) was immersed in oil (IRM903) of 140° C. for 72 hours in accordance with JIS K 6258. The volume change percentage of the hardened material was +0.3%. Note that an HNBR rubber and a fluororubber were subjected to the same test for comparison. As a result, the volume change percentages thereof were +8% and +1%, respectively. It can be understood that the hardened material of the epoxy resin of Example 1 was resistant to swelling with oil, and had satisfactory oil resistance.

Next, examples corresponding to the embodiment of the second aspect of the present invention are shown.

Example 3

First, a woven fabric in which the warp threads and the weft threads are woven into a 2/2 twill was prepared as the facing fabric. The warp threads were non-elastic threads composed of 110-dtex nylon filament yarns. The weft threads were elastic threads composed of composite yarns in which intermediate yarns made of 220-dtex para-aramid fiber yarns (product name: Technora) were wound around core yarns made of 470-dtex urethane elastic yarns, and cover yarns made of 110-dtex nylon fibers were further wound around the intermediate yarns. In a step described later, the warp threads were extended along the width direction of the belt and the weft threads were extended along the longitudinal direction of the belt.

In addition, a solution of an epoxy-rubber treatment agent composition was prepared as follows. Specifically, 70 parts by weight (in terms of solid component) of a polyglycerol polyglycidyl ether (product name: DENACOL EX-521, manufactured by Nagase ChemteX Corporation) as an epoxy resin, 3.5 parts by weight (in terms of solid component) of 2-ethyl-4-methylimidazole as a hardener, and 30 parts by weight (in terms of solid component) of NBR latex were mixed together, and the mixture was diluted with water so that a solid component concentration of 14% by weight was achieved. The facing fabric was immersed in this solution, and then dried at 180° C. for 5 minutes, so that the epoxy-rubber treatment agent composition was adhered to the facing fabric. The adhesion amount (solid component) of the epoxy-rubber treatment agent composition to the facing fabric was 40 g/m².

Next, a rubber sheet made of a rubber composition having the composition shown in Table 1 was prepared as the tooth surface rubber sheet. In addition, an unvulcanized rubber formed of HNBR loading 12 parts by weight of an aramid short fiber having a fiber length of 1 mm relative to 100 parts by weight of the rubber component was prepared as the core rubber sheet. Then, the facing fabric subjected to impregnation treatment with the epoxy-rubber treatment agent composition as described above was preformed into a corrugated shape. After that, the tooth surface rubber sheet and the core rubber sheet were adhered under pressure, in this order, onto one surface of the facing fabric. Thus, a rubber-provided preformed facing fabric was obtained.

TABLE 1

| Matrix | HNBR | 100 |
| --- | --- | --- |
| Additives | Carbon black | 10 |
| | Silica | 30 |
| | Co-crosslinking agent | 4 |
| | Resorcinol | 1.5 |
| | Melamine compound | 0.9 |
| | Stearic acid | 1.5 |
| | Plasticizer | 8 |
| | Antioxidant | 3 |
| | Vulcanizing agent (peroxide-based) | 12 |

*1 each numeric value is expressed in parts by weight.
*2 HNBR with a hydrogenation percentage of 96% was used.
*3 An oligomer which had a viscosity at 25° C. (in accordance with DIN 19268) of 5500 mPa · s, and which was a partial condensate of hexamethoxymethylolmelamine was used as the melamine compound.

Afterward, the rubber-provided preformed facing fabric, a cord made of a glass cord, and a backing rubber sheet formed of HNBR without any short fiber were wound around a toothed mold. These materials were then molded by vulcanization in a vulcanization chamber at a temperature of 160° C. for 30 minutes. And thus a belt slab was obtained. The belt slab was ground and then cut. Thus, an RU-toothed belt having a width of 19.1 mm and 92 teeth was obtained.

Example 4

Example 4 was the same as Example 3, except that the other surface of the facing fabric, which was the surface opposite from the one surface on which the rubber sheets were adhered under pressure, was covered with a hardened material of an epoxy resin. Specifically, in Example 4, a facing fabric subjected to impregnation treatment with the epoxy-rubber treatment agent composition was first obtained in the same manner as that in Example 3. Subsequently, an epoxy resin liquid, which was obtained by diluting 100 parts by weight of a novolak-type epoxy resin (epoxy equivalent: 210 g/eq) with 500 parts by weight of MEK (methyl ethyl ketone) and further adding 3 parts by weight of an imidazole-based hardener, was applied by air-spray coating onto the other surface of the facing fabric in order to achieve an adhesion amount (solid component) of 20 g/m². Afterward, the facing fabric was allowed to stand at normal temperature (25° C.) so that the MEK could evaporate. Subsequently, a toothed belt was fabricated by using the facing fabric coated with the epoxy resin liquid in the same manner as that in Example 3.

Comparative Example 2

Comparative Example 2 was conducted in the same manner as that of Example 1, except that the facing fabric was subjected to impregnation treatment with rubber cement, instead of the impregnation treatment with the epoxy-rubber treatment agent composition. Note that the rubber cement included HNBR as the rubber component, to which phenol resin was added. In addition, the adhesion amount (solid component) of the rubber cement to the facing fabric was 50 g/m².

Comparative Example 3

Comparative Example 3 was conducted in the same manner as that of Example 1, except that the facing fabric was subjected to impregnation treatment with RFL, instead of the impregnation treatment with the epoxy-rubber treatment agent composition. Note that the RFL was such that the RF/latex weight ratio was 1/5, and the latex component was NBR latex. The adhesion amount (solid component) of the RFL to the facing fabric was 50 g/m².

[Drive Test]

Figure 11:
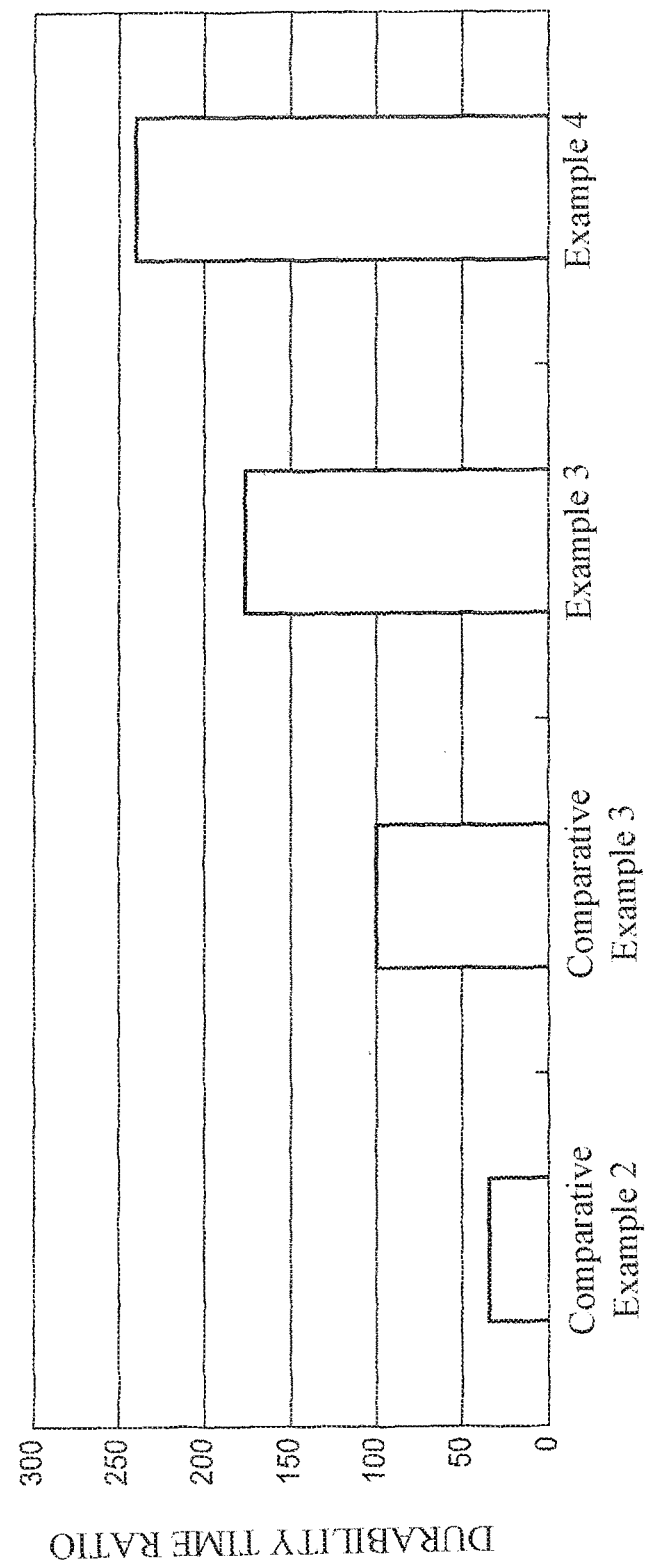
FIG. 11 is a graph showing the results of a drive test conducted on Examples 3 and 4 and Comparative Examples 2 and 3.

A drive test was conducted on the toothed belts of Examples 3 and 4 and Comparative Examples 2 and 3 described above by using the drive test machine shown in FIG. 6. The drive test machine 40 has a toothed driving pulley 41 having 20 teeth and a diameter of 60 mm, toothed driven pulleys 42 and 43 each having 40 teeth and a diameter of 121 mm, and a flat tensioner pulley 44 having a diameter of 80 mm. The toothed belt 10 was wound around the pulleys 41 to 43. In a state where tension was applied to the toothed belt 10 from the outer peripheral side with the tensioner pulley 44 on the slack side of the belt, the toothed belt 10 was driven at 4000 rpm under a load per single tooth of 9.2 N/mm. The test was conducted in an environment with an ambient temperature of 120° C., and the elapsed operation time until belt failure was measured as the durability time. FIG. 11 shows the ratio of the durability time of each belt, where the durability time of the belt of Comparative Example 3 was assigned the value of 100.

[Drive Test for Water Resistance]

Figure 12:
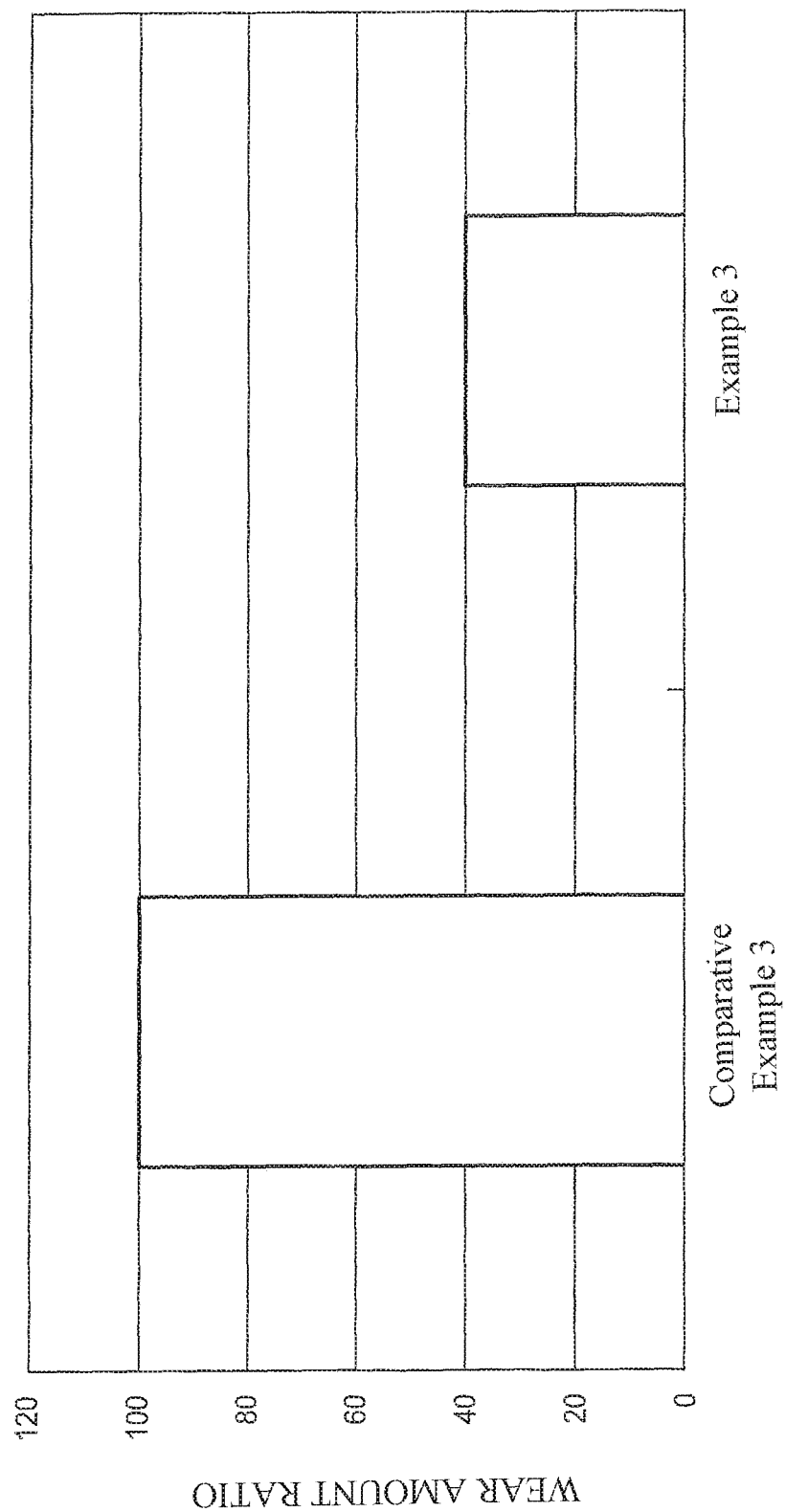
FIG. 12 is a graph showing the results of a drive test for water resistance conducted on Example 3 and Comparative Example 3.

Each belt was operated for 200 hours in the same manner as that in the drive test, except that the environment temperature was changed to 80° C., and water was poured over the belt at a predetermined position at 1 liter/hour. The thickness of the facing fabric was measured before and after the test, and an evaluation was made by using the value obtained by subtracting the thickness of the facing fabric after the test from the thickness of the facing fabric before the test as the wear amount of the facing fabric during operation in a water-wet state. FIG. 12 shows the wear ratio of the facing fabric of each of the belts of Comparative Example 3 and Example 3, where the wear amount of the facing fabric of the belt of Comparative Example 3 was assigned the value of 100. Note, however, that this test was not conducted on Example 4 and Comparative Example 2.

[Drive Test for Oil Resistance]

Figure 13:
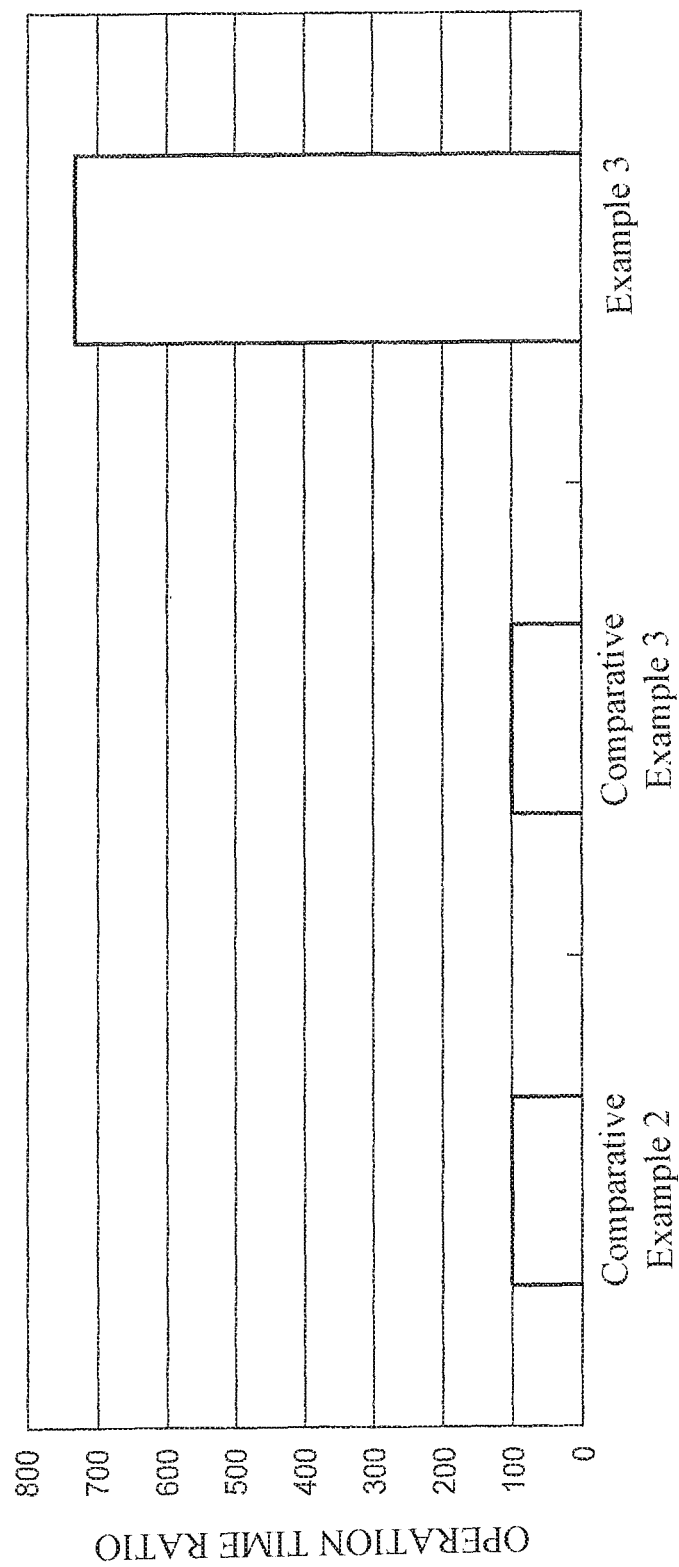
FIG. 13 is a graph showing the results of a drive test for oil resistance conducted on Example 3 and Comparative Examples 2 and 3.

Each belt was driven in the same manner as that in the drive test, except that the environment temperature was changed to 130° C., engine oil was poured over the belt at a predetermined position, the load per single tooth was 8 N/mm, and the number of revolutions was 5400 rpm. Then, the elapsed operation time until belt failure was measured. FIG. 13 shows the ratio of the operation time of each belt, where the operation time of the belt of Comparative Example 3 was assigned the value of 100. Note, however, that this test was not conducted on Example 4.

[Adhesion Strength]

Next, Adhesion-Test Samples A to H were prepared as follows, and the change in the adhesion strength was determined as the ratio between the epoxy resin and the latex in the epoxy-rubber treatment agent composition was changed.

[Sample A]

A facing fabric subjected to impregnation treatment with the same solution of the epoxy-rubber treatment agent composition as that in Example 3 was prepared. The facing fabric was adhered to a 4 mm-thick rubber sheet, which was made of a rubber composition having the constitution shown in Table 1, by vulcanization at 160° C. for 20 minutes at a pressure of 40 kgf. Thus, Adhesion-Test Sample A having a width of 25 mm and a length of 120 mm was obtained.

[Sample B]

Adhesion-Test Sample B was obtained in the same manner as that of Sample A, except that the incorporated amounts of materials were changed in the preparation of the solution of the epoxy-rubber treatment agent composition as follows: polyglycerol polyglycidyl ether was 50 parts by weight, 2-ethyl-4-methylimidazole was 2.5 parts by weight, and the NBR latex was 50 parts by weight, in terms of solid component.

[Sample C]

Adhesion-Test Sample C was obtained in the same manner as that of Sample A, except that the incorporated amounts of materials were changed in the preparation of the solution of the epoxy-rubber treatment agent composition as follows: polyglycerol polyglycidyl ether was 30 parts by weight, 2-ethyl-4-methylimidazole was 1.5 parts by weight, and the NBR latex was 70 parts by weight, in terms of solid component.

[Sample D]

A solution of an epoxy treatment agent composition without latex was prepared as follows. Specifically, 100 parts by weight (in terms of solid component) of a polyglycerol polyglycidyl ether (DENACOL EX-521) and 5 parts by weight (in terms of solid component) of 2-ethyl-4-methylimidazole were mixed together and the mixture was diluted with water so that a solid component concentration of 14% by weight was achieved. Adhesion-Test Sample D was obtained in the same manner as that of Sample A, except that the facing fabric was subjected to impregnation treatment with this solution of the epoxy treatment agent composition without latex, instead of the impregnation treatment with the solution of the epoxy-rubber treatment agent composition.

[Sample E]

Adhesion-Test Sample E was obtained in the same manner as that of Sample A, except that the solution of the epoxy-rubber treatment agent composition was changed to a solution prepared as follows. Specifically, 70 parts by weight (in terms of solid component) of a cresol novolak-type epoxy resin (product name: DENACOL EM-160, manufactured by Nagase ChemteX Corporation) as an epoxy resin, 3.5 parts by weight (in terms of solid component) of 2-ethyl-4-methylimidazole as a hardener, and 30 parts by weight (in terms of solid component) of NBR latex were mixed together, and the mixture was diluted with water so that a solid component concentration of 14% by weight was achieved.

[Sample F]

Adhesion-Test Sample F was obtained in the same manner as that of Sample E, except that the incorporated amounts of materials were changed in the preparation of the solution of the epoxy-rubber treatment agent composition as follows: the cresol novolak-type epoxy resin was 50 parts by weight, 2-ethyl-4-methylimidazole was 2.5 parts by weight, and the NBR latex was 50 parts by weight, in terms of solid component.

[Sample G]

Adhesion-Test Sample G was obtained in the same manner as that of Sample E, except that the incorporated amounts of materials were changed in the preparation of the solution of the epoxy-rubber treatment agent composition as follows: the cresol novolak-type epoxy resin was 30 parts by weight, 2-ethyl-4-methylimidazole was 1.5 parts by weight, and the NBR latex was 70 parts by weight, in terms of solid component.

[Sample H]

A solution of an epoxy treatment agent composition without latex was prepared as follows. Specifically, 100 parts by weight (in terms of solid component) of a cresol novolak-type epoxy resin (DENACOL EM-160) and 5 parts by weight (in terms of solid component) of 2-ethyl-4-methylimidazole were mixed together, and the mixture was diluted with water so that a solid component concentration of 14% by weight was achieved. Adhesion-Test Sample H was obtained in the same manner as that of Sample E, except that the facing fabric was subjected to impregnation treatment with this solution of the epoxy treatment agent composition without latex, instead of the impregnation treatment with the epoxy-rubber treatment agent composition.

Figure 14:
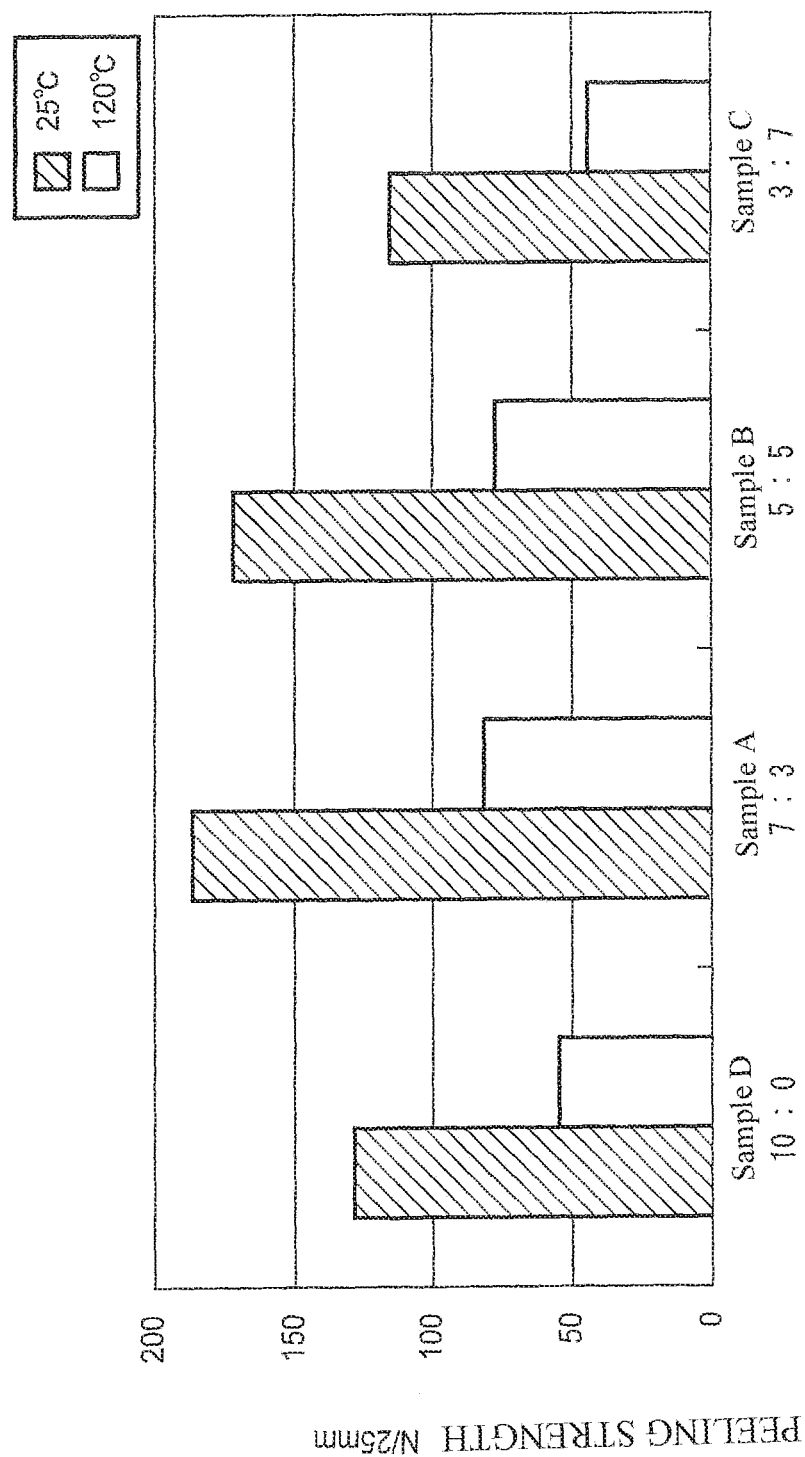
FIG. 14 is a graph showing the results of an adhesion test in cases where an aliphatic-type epoxy resin was used.
Figure 15:
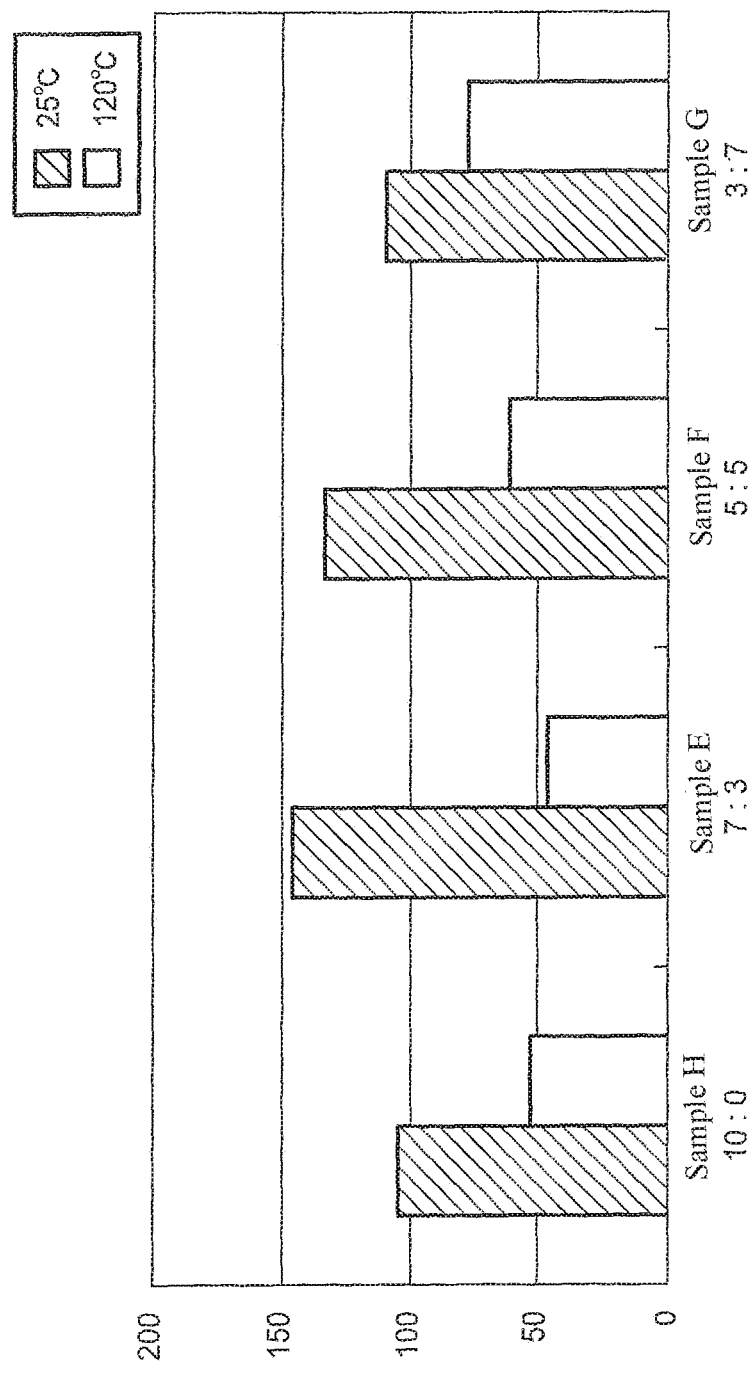
FIG. 15 is a graph showing the results of an adhesion test in cases where a novolak-type epoxy resin was used.

The peeling strength between the facing fabric and the rubber sheet was measured by using each of Adhesion-Test Samples A to H under a normal-temperature environment (23° C.) and a high-temperature environment (120° C.) in accordance with JIS K 6256-1: 2006. FIGS. 14 and 15 show the results.

As shown in FIGS. 11 to 13, the belt of Example 3, whose facing fabric was treated with the epoxy-rubber treatment agent, achieved better belt lifetime and wear resistance than the belts of Comparative Examples 2 and 3, whose facing fabrics were treated with the rubber cement or subjected to the RFL treatment; all under the high-temperature and high-load conditions and in the presence of oil and water. Moreover, it can be understood that further improvements in belt lifetime can be achieved with the use of an epoxy resin coating such as the one in Example 4.

Moreover, as shown in FIGS. 14 and 15, the peeling strength was not sufficiently improved for each sample with a hardened coating composed of only a hardened material of an epoxy resin. On the other hand, the peeling strength of each sample whose facing fabric was covered with the epoxy resin-rubber was improved. In Particular, in the case of the aliphatic type, Samples A and B, in which the weight of the epoxy resin was not less than the weight of the latex, achieved satisfactory peeling strength. In addition, in the case of the novolak type, all the samples achieved satisfactory peeling strength.

Note that it was found that the facing fabrics of Samples E, F, and H were relatively rigid based on the texture to the touch thereof. For this reason, degradation in performance such as lack of durability may occur in Samples E and F, although the peeling strength is satisfactory. In contrast, the facing fabrics of Samples A, B, and G were not so rigid, and had satisfactory peeling strength. Hence, it is conceivable that the facing fabrics of Samples A, B, and G are highly likely to improve performance such as durability of belts.

The invention claimed is:

1. A toothed belt comprising a belt body that includes a tooth portion and a tooth bottom portion alternately provided on one surface side thereof along the longitudinal direction, and a facing fabric which is provided on the one surface of the belt body and has an outer surface covered with a hardened material consisting of a hardened first epoxy resin.

2. The toothed belt according to claim 1, wherein the softening point of the hardened material of the first epoxy resin is 110° C. or higher.

3. The toothed belt according to claim 1, wherein the epoxy equivalent of the first epoxy resin is 100 to 1,500 g/eq.

4. The toothed belt according to claim 1, wherein the hardened material of the first epoxy resin is applied to the facing fabric after the facing fabric is subjected to RFL treatment.

5. The toothed belt according to claim 1, wherein the first epoxy resin is hardened by a first hardener.

6. The toothed belt according to claim 5, wherein the first hardener includes at least one hardener selected from the group consisting of amine-based hardener, acid anhydride-based hardener, phenol novolak-based hardener, imidazole-based hardener, and dicyandiamide-based hardener.

7. The toothed belt according to claim 6, wherein the first hardener is an imidazole-based hardener.

8. The toothed belt according to claim 1, wherein the first epoxy resin includes at least one epoxy resin selected from the group consisting of bisphenol A epoxy resin, bisphenol F epoxy resin, novolak-type epoxy resin, biphenyl-type epoxy resin, phenoxy-type epoxy resin, and long-chain aliphatic epoxy resin.

9. A method of manufacturing a toothed belt having a belt body that includes a tooth portion and a tooth bottom portion alternately provided on one surface side thereof along the longitudinal direction, said method comprising:
coating one surface of a facing fabric with a first epoxy resin solution consisting of a solvent, a first epoxy resin and a first hardener;
evaporating the solvent;
integrating rubber disposed on the other surface side of the coated facing fabric with the facing fabric; and
hardening the first epoxy resin coating the facing fabric by vulcanization.

10. The toothed belt according to claim 1, wherein the first epoxy resin includes at least one epoxy resin selected from the group consisting of novolak-type epoxy resin and bisphenol-A epoxy resin.

11. The toothed belt according to claim 4, wherein the dry weight per unit area of the first epoxy resin applied to the facing fabric is less than half of the dry weight per unit area of the RFL treatment.

12. The toothed belt according to claim 1, wherein said facing fabric has unevenness on the outer surface due to a weave texture of the facing fabric, and wherein said dry weight per unit area of the first epoxy resin applied to the facing fabric is such that said unevenness remains on the outer surface.

13. The toothed belt according to claim 1, wherein the dry weight per unit area of the first epoxy resin applied to the facing fabric is in the range from about 10 $g/m^2$ to about 50 $g/m^2$.

14. The toothed belt according to claim 1, wherein the hardened material of the first epoxy resin is applied to the facing fabric after the facing fabric is subjected to a treatment agent composition including a second epoxy resin, a second hardener for hardening the second epoxy resin, and a rubber component.

15. The toothed belt according to claim 14 wherein the rubber component includes nitrile rubber, hydrogenated nitrile rubber, or hydrogenated carboxylic nitrile rubber.

16. The toothed belt according to claim 14, wherein the weight ratio of the second epoxy resin to the rubber component is from 1:9 to 9:1.

17. The toothed belt according to claim 14, wherein the adhesion amount (solid component) of the treatment agent composition to the facing fabric is from 5 to 200 $g/m^2$.

18. The toothed belt according to claim 14, wherein the rubber component is latex.

19. The toothed belt according to claim 14, wherein the treatment agent composition further includes a vulcanizing agent for vulcanizing the rubber component.

* * * * *